United States Patent
Tsunashima

(10) Patent No.: US 11,132,553 B2
(45) Date of Patent: Sep. 28, 2021

(54) INFORMATION PROCESSING APPARATUS AND INFORMATION PROCESSING METHOD

(71) Applicant: SONY CORPORATION, Tokyo (JP)

(72) Inventor: Nobuhiro Tsunashima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/621,860

(22) PCT Filed: May 10, 2018

(86) PCT No.: PCT/JP2018/018105
§ 371 (c)(1),
(2) Date: Dec. 12, 2019

(87) PCT Pub. No.: WO2019/017046
PCT Pub. Date: Jan. 24, 2019

(65) Prior Publication Data
US 2020/0167571 A1    May 28, 2020

(30) Foreign Application Priority Data
Jul. 21, 2017  (JP) .............................. JP2017-141808

(51) Int. Cl.
*G06K 9/00*    (2006.01)
(52) U.S. Cl.
CPC .................... *G06K 9/00724* (2013.01); *G06K 2009/00738* (2013.01)
(58) Field of Classification Search
CPC ...... G06K 9/00724; G06K 2009/00738; G06F 16/7837; H04N 21/8405
See application file for complete search history.

(56) References Cited

U.S. PATENT DOCUMENTS

| | | |
|---|---|---|
| 2008/0247601 A1 | 10/2008 | Ito et al. |
| 2009/0292549 A1 | 11/2009 | Ma et al. |
| 2010/0036875 A1 | 2/2010 | Miezianko et al. |
| 2010/0046823 A1 | 2/2010 | O Ruanaidh et al. |
| 2014/0305352 A1 | 10/2014 | Dowling et al. |

(Continued)

FOREIGN PATENT DOCUMENTS

| | | |
|---|---|---|
| CA | 2676125 A1 | 8/2008 |
| CN | 101611411 A | 12/2009 |

(Continued)

OTHER PUBLICATIONS

International Search Report and Written Opinion of PCT Application No. PCT/JP2018/018105, dated Jul. 31, 2018, 09 pages of ISRWO.

(Continued)

*Primary Examiner* — Dhaval V Patel
(74) *Attorney, Agent, or Firm* — Chip Law Group

(57) ABSTRACT

An information processing apparatus including a setting processor that sets metadata for objects included in captured images captured in a time series by an imaging device based on the captured image, in which the setting processor processes the captured images in a reverse time series reverse to the time series from a predetermined event detected from the captured images and sets the metadata for objects involved in the predetermined event among the objects included in the captured images.

19 Claims, 13 Drawing Sheets

(56) References Cited

U.S. PATENT DOCUMENTS

| | | | | |
|---|---|---|---|---|
| 2017/0236010 A1* | 8/2017 | Tojo | ............ | G06K 9/00744 |
| | | | | 382/103 |
| 2018/0101732 A1 | 4/2018 | Uchiyama et al. | | |
| 2018/0144479 A1* | 5/2018 | Nakasu | ............ | G06F 16/5866 |
| 2019/0068945 A1* | 2/2019 | Maruyama | ............ | H04N 13/194 |

FOREIGN PATENT DOCUMENTS

| | | | |
|---|---|---|---|
| CN | 107431786 A | 12/2017 | |
| EP | 2151787 A2 | 2/2010 | |
| EP | 2219379 A2 | 8/2010 | |
| EP | 3272117 A1 | 1/2018 | |
| JP | 2006-285878 A | 10/2006 | |
| JP | 2008-252519 A | 10/2008 | |
| JP | 2010-525299 A | 7/2010 | |
| JP | 2014-089191 A | 5/2014 | |
| JP | 2016-110381 A | 6/2016 | |
| JP | 2016-143302 A | 8/2016 | |
| JP | 2016-174252 A | 9/2016 | |
| WO | 2008/100704 A2 | 8/2008 | |
| WO | 2016/147644 A1 | 9/2016 | |

OTHER PUBLICATIONS

Extended European Search Report of EP Application No. 18835140.7, dated Apr. 29, 2020, 08 pages.

* cited by examiner

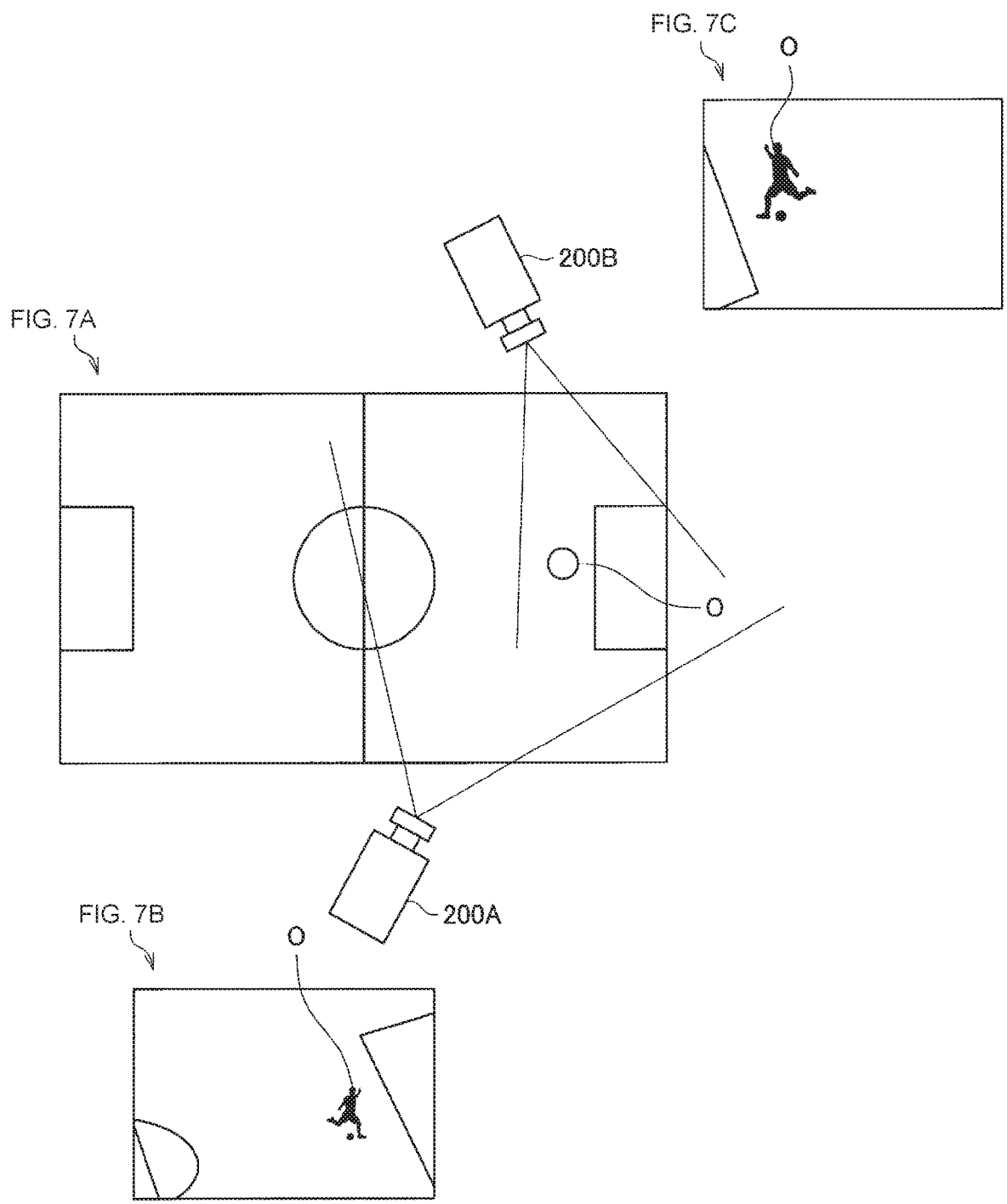

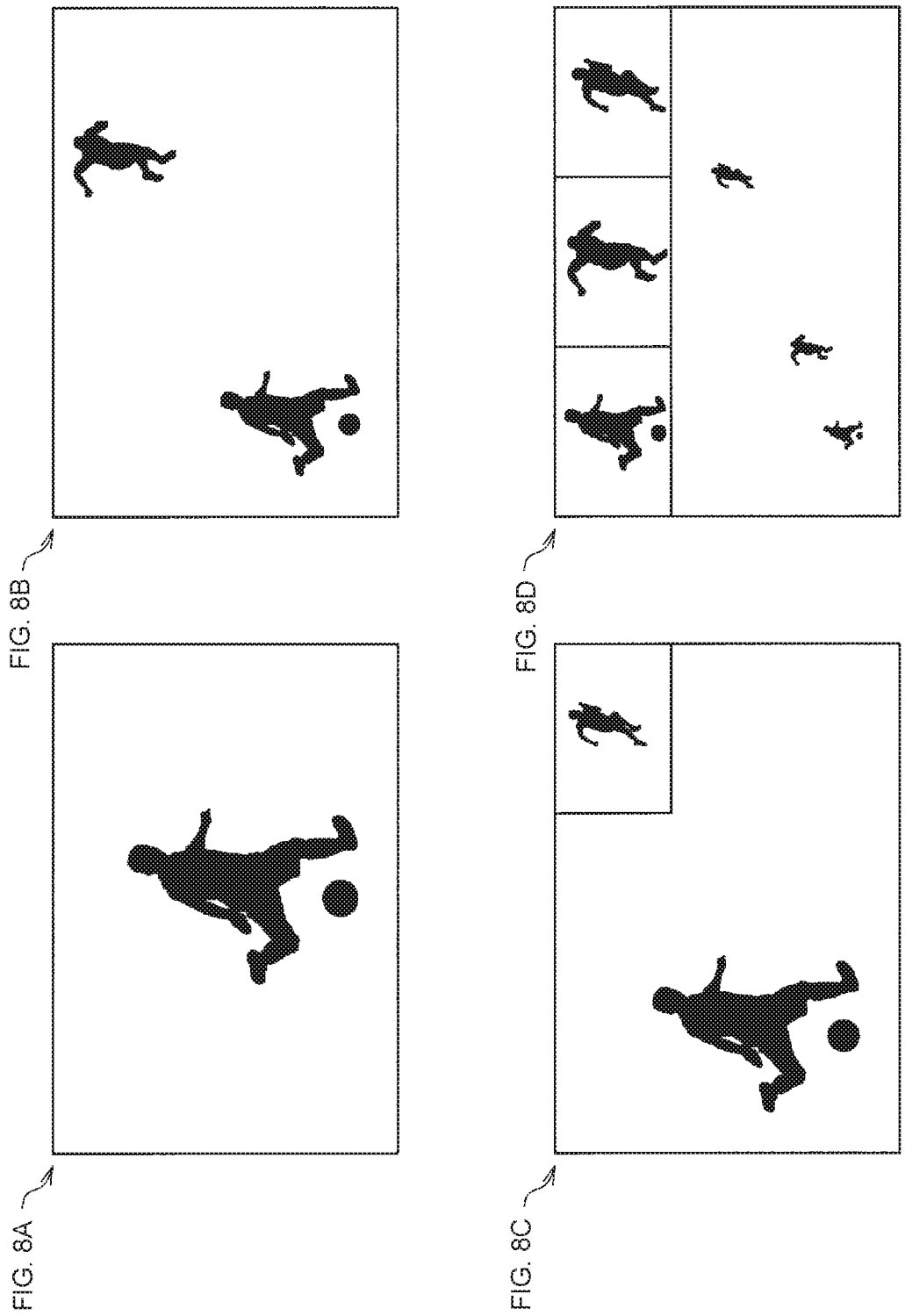

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/018105 filed on May 10, 2018, which claims priority benefit of Japanese Patent Application No. JP 2017-141808 filed in the Japan Patent Office on Jul. 21, 2017. Each of the above-referenced applications is hereby incorporated herein by reference in its entirety.

TECHNICAL FIELD

The present disclosure relates to an information processing apparatus and an information processing method.

BACKGROUND ART

Technologies for analyzing captured images captured by imaging devices and detecting events have been developed. As a technology for detecting events, for example, a technology disclosed in Patent Document 1 below can be exemplified. In addition, technologies for measuring numbers of objects included in captured images captured by imaging devices have been developed. As a technology for measuring numbers of objects included in captured images described above, for example, a technology disclosed in Patent Document 2 below can be exemplified.

CITATION LIST

Patent Document

Patent Document 1: Japanese Patent Application Laid-Open No. 2006-285878
Patent Document 2: Japanese Patent Application Laid-Open No. 2016-110381

SUMMARY OF THE INVENTION

Problems to be Solved by the Invention

For example, for various purposes such as crime prevention, analysis of sports matches, or the like, captured images (moving images or still images) captured by imaging devices are used.

For example, a device using the technology disclosed in Patent Document 1 generates a silhouette image from a captured image, tracks a silhouette included in the silhouette image as a tracking region, and detects and identifies an event on the basis of a tracking result.

Here, for example, in sports such as soccer, rugby, or the like in which victory or defeat is decided in accordance with a score, a plurality of people including a person obtaining a point is involved in an event such as scoring in some cases.

However, in a case where a silhouette indicating a person, an object, scenery, or the like is tracked and an event is detected as in the technology disclosed in Patent Document 1, only a person or the like directly involved in the detected event is considered. Accordingly, even if a processed result related to the technology disclosed in Patent Document 1 is used, a whole picture of an event may not necessarily be ascertained.

In addition, for example, by using the technology disclosed in Patent Document 2, it is possible to measure numbers of objects recognized from captured images. In the technology disclosed in Patent Document 2, however, relevance of an object recognized from a captured image is not considered. Accordingly, even if a processed result related to the technology disclosed in Patent Document 2 is used, a whole picture of an event may not necessarily be ascertained.

The present disclosure proposes a novel and improved information processing apparatus and information processing method capable of assisting with ascertainment of a predetermined event detected on the basis of a captured image.

Solutions to Problems

According to the present disclosure, there is provided an information processing apparatus including: a setting processor configured to set metadata for objects included in captured images captured in a time series by an imaging device on the basis of the captured image, in which the setting processor processes the captured images in a reverse time series reverse to the time series from a predetermined event detected from the captured images and sets the metadata for objects involved in the predetermined event among the objects included in the captured images.

In addition, according to the present disclosure, there is provided an information processing method executed by an information processing apparatus, the method including: setting metadata for objects included in captured images captured in a time series by an imaging device on the basis of the captured image, in which, in the setting, the captured images are processed in a reverse time series reverse to the time series from a predetermined event detected from the captured images and the metadata is set for objects involved in the predetermined event among the objects included in the captured images.

Effects of the Invention

According to the present disclosure, it is possible to assist with ascertainment of a predetermined event detected on the basis of a captured image.

Note that the effects described above are not necessarily limitative. With or in the place of the above effects, there may be achieved any one of the effects described in this specification or other effects that may be grasped from this specification.

BRIEF DESCRIPTION OF DRAWINGS

FIGS. 7A, 7B, and 7C are explanatory diagrams illustrating a third example of a setting process related to an information processing method according to the embodiment.

FIGS. 8A, 8B, 8C, and 8B are explanatory diagrams illustrating an example of an editing process related to the information processing method according to the embodiment.

MODE FOR CARRYING OUT THE INVENTION

Figure 1:
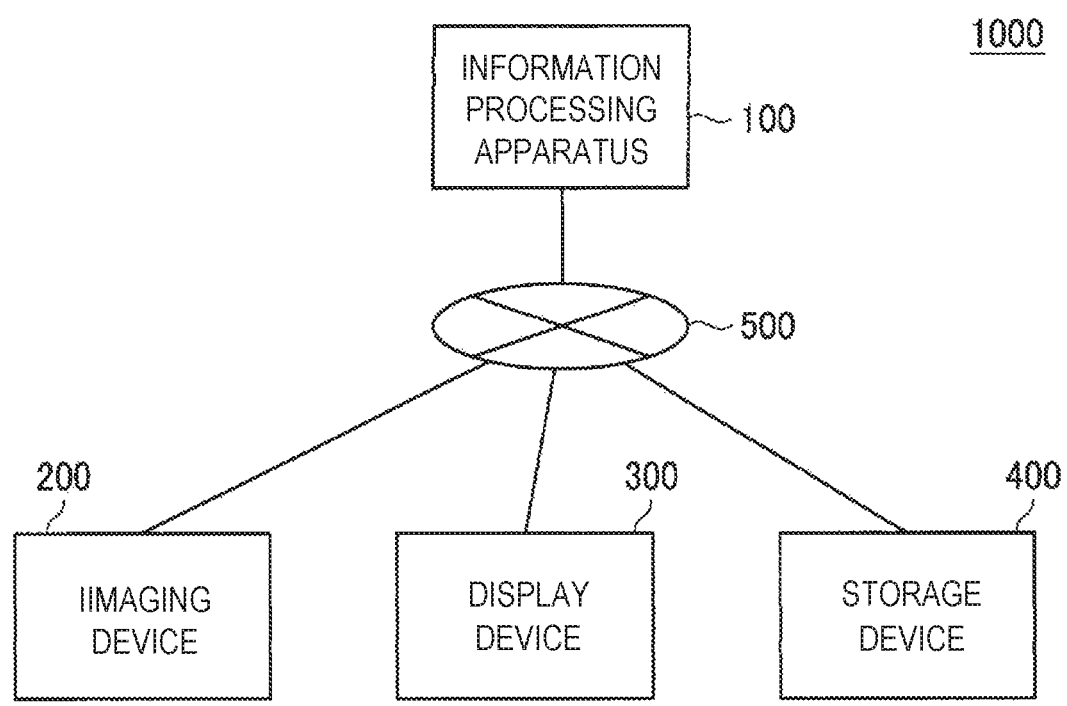
FIG. 1 is an explanatory diagram illustrating an example of a configuration of an information processing system according to an embodiment.

Hereinafter, a preferred embodiment of the present disclosure will be described in detail with reference to the appended drawings. Note that, in this specification and the appended drawings, components that have substantially the same function and configuration are denoted with the same reference numerals, and repeated explanation of these structural elements is omitted.

In addition, hereinafter, description will be made in the following order.
1. Information processing system according to embodiment and information processing method according to embodiment
2. Program according to embodiment (Information Processing System According to Embodiment and Information Processing Method According to Embodiment)

Hereinafter, an information processing method according to an embodiment will be described while describing an example of an information processing system according to the embodiment.

[1] Configuration of Information Processing System

FIG. 1 is an explanatory diagram illustrating an example of a configuration of an information processing system 1000 according to an embodiment. The information processing system 1000 includes, for example, an information processing apparatus 100, an imaging device 200, a display device 300, and a storage device 400.

The information processing apparatus 100, the imaging device 200, the display device 300, and the storage device 400 are each connected in a wireless or wired manner, for example, via a network 500. Examples of the network 500 include a wired network such as a local area network (LAN), a wide area network (WAN), or the like, a wireless network such as wireless local area network (WLAN) or the like, and the Internet using a communication protocol such as transmission control protocol/Internet protocol (TCP/IP) or the like. Note that in the information processing system according to the embodiment, some or all of the information processing apparatus 100, the imaging device 200, the display device 300, and the storage device 400 can also directly communicate with one another without the network 500.

Note that the information processing system according to the embodiment is not limited to the example illustrated in FIG. 1.

For example, some or all of the imaging device 200, the display device 300, and the storage device 400 may be devices included in the information processing apparatus 100. In addition, the information processing system according to the embodiment may not include one or both of, for example, the display device 300 and the storage device 400.

In addition, one imaging device 200 is illustrated in FIG. 1, but the information processing system according to the embodiment may include the plurality of imaging devices 200. In a case where the information processing system according to the embodiment includes the plurality of imaging devices 200, some of the plurality of imaging devices 200 may be imaging devices included in the information processing apparatus 100.

In addition, one display device 300 is illustrated in FIG. 1, but the information processing system according to the embodiment may include the plurality of display devices 300. In a case where the information processing system according to the embodiment includes the plurality of display devices 300, some of the plurality of display devices 300 may be display devices included in the information processing apparatus 100.

In addition, one storage device 400 is illustrated in FIG. 1, but the information processing system according to the embodiment may include the plurality of storage devices 400. In a case where the information processing system according to the embodiment includes the plurality of storage devices 400 some of the plurality of storage devices 400 may be display devices included in the information processing apparatus 100.

Hereinafter, devices included in the information processing system 1000 will be described mainly exemplifying the information processing system 1000 illustrated in FIG. 1.

[1-1] Imaging Device 200

The imaging device 200 is an imaging unit in the information processing system 1000 and corresponds to an external imaging device from the viewpoint of the imaging processing device 100. The imaging device 200 images, for example, a region appropriate for a purpose of using the information processing system 1000, such as "a court or a field (an example of the case of a purpose of analyzing a sports match)," "a space for providing crime prevention measures (an example of the case of a purpose of crime prevention)," or the like. One or both of a position and posture of the imaging device 200 may be fixed or vary.

The imaging device 200 includes, for example, a lens/imaging element and a signal processing circuit. The lens/imaging element is configured with, for example, lenses of an optical system and an image sensor using a plurality of imaging elements such as a complementary metal oxide semiconductor (CMOS) or a charge coupled device (CCD). The signal processing circuit includes, for example, an automatic gain control (AGC) circuit and an analog to digital converter (ADC), and converts an analog signal generated by the imaging element into a digital signal (image data). Further, for example, the signal processing circuit performs various kinds of processes related to RAW development. Further, the signal processing circuit may perform various kinds of signal processing such as white balance correction processing, color tone correction processing, gamma correction processing, YCbCr conversion processing, edge enhancement processing, and the like.

Note that the configuration of the imaging device 200 is not limited to the above-described example and a configuration can be implemented in accordance with an application example of the imaging device 200 to be described below.

For example, the imaging device 200 is driven with power supplied from an internal power source such as a battery or the like included in the imaging device 200, power or the like supplied from a connected external power source, or the like.

[1-2] Display Device 300

The display device 300 is a display unit in the information processing system 1000 and corresponds to an external display device from the viewpoint of the information processing apparatus 100. For example, the display device 300 displays various images such as a captured image (a moving image or a plurality of still images: the same applies below) captured in the information processing apparatus 100, an image related to a user interface (UI) on a display screen, or the like. The display in the display device 300 is controlled by, for example, the information processing apparatus 100.

Examples of the display device 300 include a liquid crystal display, an organic electro-luminescence (EL) display, a cathode ray tube (CRT) display, and the like.

Note that the display device 300 is not limited to the above-described examples.

For example, the display device 300 may be any wearable device such as a head-mounted display, a glasses type device, or the like that is worn on a human body for use. In addition, another application example of the display device 300 will be described later.

For example, the display device 300 is driven with power supplied from an internal power source such as a battery or the like included in the display device 300, power or the like supplied from a connected external power source, or the like.

[1-3] Storage Device 400

The storage device 400 is a storage unit in the information processing system 1000 and corresponds to an external storage device from the viewpoint of the information processing apparatus 100. The storage device 400 stores, for example, various kinds of data such as captured images or the like captured in the information processing apparatus 100.

Examples of the storage device 400 include a magnetic recording medium such as a hard disk or the like, a non-volatile memory such as a flash memory or the like, and the like. In addition, another application example of the storage device 400 will be described later.

[1-4] Information Processing Apparatus 100

The information processing apparatus 100 performs a process related to an information processing method according to the embodiment.

[1-4-1] Overview of Process Related to Information Processing Method According to Embodiment First, an overview of a process related to the information processing method according to the embodiment performed by the information processing apparatus 100 will be described.

For example, in a case where the information processing system 1000 is used for the purpose of analyzing a sports match such as soccer, rugby, or the like, a plurality of people is involved in a scoring event (an example of an event) in which a point is obtained in some cases, as described above.

In addition, for example, even in a case where the information processing system 1000 is used for the purpose of crime prevention, a plurality of people is involved in an event such as an accident, a crime, or the like (an example of an event) in some cases. Examples of the plurality of people involved in an event such as an accident, a crime, or the like include an injuring party and a victim in an accident or a perpetrator, a person who comes in contact with the perpetrator in a crime, and the like.

As described above, in a case where a silhouette of a person or the like is tracked and an event is detected as in the technology disclosed in Patent Document 1, only a person or the like directly involved in the detected event is considered.

In addition, in a case where the number of objects recognized from a captured image is measured as in the technology disclosed in Patent Document 2, relevance of the objects recognized from the captured image is not considered.

Accordingly, even if a known technology such as the technology disclosed in Patent Document 1, the technology disclosed in Patent Document 2, or the like is used, for example, it is difficult to ascertain "a whole picture of an event such as how an event occurs" or the like.

As one example, an example in which a scoring event (an example of an event) is detected from captured images captured by a camera (an example of an imaging device) disposed in a soccer field is given. In a case where one player constantly retains a ball and scores, a whole picture of a scoring event can be ascertained by using a known technology such as the technology disclosed in Patent Document 1. In addition, in a case where a plurality of players passes a ball and score as a result, a situation of the players involved with the ball can be ascertained by using the known technology if each player is involved with the ball. However, in a case where a plurality of players passes a ball and score as a result, how each player moves before receiving the ball may not be ascertained even if the known technology is used.

In addition, as another example, an example in which an event of a crime (an example of an event) is detected from captured images captured by a crime prevention camera (an example of an imaging device) is given. By using the known technology such as the technology disclosed in Patent Document 1, it is possible to find and track a perpetrator directly involved in the event of the crime from a captured image. However, even if the known technology is used, for example, an action of a person who has come in contact with the perpetrator, that is, an action of a person who is likely to be indirectly involved in the event of the crime, may not be tracked.

Accordingly, the information processing apparatus 100 processes captured images captured in a time series by the imaging device 200 and sets metadata in objects involved in a predetermined event detected from the captured images among objects included in the captured images. Hereinafter, a process of setting metadata on the basis of captured images is referred to as "a setting process" in some cases.

Here, the captured images captured in the time series by the imaging device 200 according to the embodiment are, for example, "captured images obtained as a result of the imaging device 200 consecutively imaging a temporal change within an imaging range" or "captured images obtained as a result of the imaging device 200 inconsecutively imaging a temporal change at a predetermined interval within an imaging range". The predetermined interval may be a constant temporal interval or may be an inconstant temporal interval. "The captured images obtained as a result of the imaging device 200 consecutively imaging the temporal change within the imaging range" correspond to a moving image. In addition, "the captured images obtained as a result of the imaging device 200 inconsecutively imaging the temporal change at the predetermined interval within the imaging range" correspond to a plurality of still images with different captured time points.

Hereinafter, a reverse time direction to "a time direction corresponding to captured images captured in a time series" is referred to "a reverse time series". "The time direction corresponding to the captured images captured in the time series" corresponds to a direction from the past to the present or the future and the reverse time series corresponds to a direction from a certain time point to the past.

Examples of the objects included in the captured images include one or both of people or living things such as animals other than people or the like and nonliving things such as a ball, a backstop, and the like. Note that the objects according to the embodiment are not limited to the above-described examples. Examples of the objects according to the embodiment, any object which can be detected using any object detection process of detecting an object from an image.

The object detection process of detecting an object from a captured image may be performed by the information processing apparatus 100 or may be performed by an external apparatus of the information processing apparatus 100, such as an external server of the information processing apparatus 100 or the like. In a case where the object detection process is performed by an external apparatus, the information processing apparatus 100 performs a process related to the information processing method according to the embodiment using a result of the object detection process in the external device.

Examples of the predetermined event detected from the captured images include any event which can be detected from captured images in response to any event detection process, such as a scoring event, an event of an accident, an event of a crime, and the like as described above. When an event detection process in the case of detection of a scoring event in soccer from captured images is given as an example of the event detection process, a scoring event is detected, for example, by setting the position of a goal in a captured image in advance, subsequently tracking the position of a ball during the match from captured images, and searching for a scene in which the ball enters the goal. When an event detection process in the case of detection of a scoring event in rugby from captured images is given as an example of the event detection process, a scoring event is detected, for example, by setting the position of a goal in captured images in advance and subsequently searching for a scene in which a player retaining a ball passes a preset goal line from the captured images. In addition, the event detection process may be a process of detecting any event such as a scoring event or the like on the basis of an operation of a user indicating occurrence of an event (a process involved in manual detection of an event).

The event detection process of detecting a predetermined event from a captured image may be performed by the information processing apparatus 100 or may be performed by an external apparatus of the information processing apparatus 100, such as an external server of the information processing apparatus 100 or the like. In a case where the event detection process is performed by an external apparatus, the information processing apparatus 100 performs a process related to the information processing method according to the embodiment using a result of the event detection process in the external device.

Examples of the objects involved in the predetermined event according to the embodiment, "objects directly involved in the predetermined event," or "objects directly involved in the predetermined event and objects indirectly involved in the predetermined event". That is, the objects involved in the predetermined event can include not only objects directly involved in the predetermined event but also objects indirectly involved in the predetermined event.

The objects directly involved in the predetermined event correspond to, for example, "a scoring player" (an example of an object directly involved in the predetermined event in a case where the predetermined event is a scoring event), "a perpetrator of a crime" (an example of an object directly involved in the predetermined event in a case where the predetermined event is an event of a crime), and the like. Hereinafter, an object directly involved in the predetermined event is referred to as "a first object" in some cases.

In addition, the objects indirectly involved in the predetermined event correspond to, for example, "a player passing a ball to a scoring player" (an example of an object indirectly involved in the predetermined event in a case where the predetermined event is a scoring event), "a person who comes in contact with a perpetrator of a crime" (an example of an object indirectly involved in the predetermined event in a case where the predetermined event is an event of a crime), and the like. Hereinafter, an object indirectly involved in the predetermined event is referred to as "a second object" in some cases.

An example of a process related to identification of an object involved in the predetermined event will be described next.

The metadata according to the embodiment is data regarding an object involved in the predetermined event. An object for which metadata is set indicates an object involved in the predetermined event. That is, by setting metadata in objects included in captured images in the information processing system 1000, an object involved in the predetermined event is identified among the objects included in the captured images.

The metadata according to the embodiment includes, for example, distinguishing information for distinguishing objects involved in the predetermined event and the positions of the objects in captured images. Examples of the identification information according to the embodiment include a specific ID for each object. The specific ID may be a random number or may be a value including a specific value of the imaging device 200 capturing captured images. In addition, the position of an object in the captured images is expressed with, for example, coordinate values of a set coordinate system such as two-dimensional coordinates or the like at which any position in the captured images is the origin. Hereinafter, the position of an object in captured images is simply referred to as "the position of the object" in some cases.

Note that the metadata according to the embodiment may include any data regarding an object involved in the predetermined event. Hereinafter, the metadata according to the embodiment is referred to as "a tag" in some cases.

In addition, in the metadata set in an object involved in the predetermined event, a hierarchy may be provided. The metadata can be hierarchically classified into, for example, "metadata set for objects directly involved in the predetermined event and metadata set for objects indirectly involved in the predetermined event". In addition, the metadata set for objects indirectly involved in the predetermined event may be further classified into a plurality of hierarchies.

The information processing apparatus 100 sets the metadata for objects included in captured images in response to any process capable of associating the objects involved in the predetermined event with the metadata, for example, as will be described below. Note that it goes without saying that the process of setting the metadata in the objects included in the captured images is not limited to the following examples:

- a process of embedding the metadata in the captured images including the objects involved in the predetermined event; and
- a process of recording metadata separate from the captured images including the objects involved in the predetermined event in a recording medium in association with the captured images.

More specifically, the information processing apparatus 100 processes the captured images in the reverse time series from the predetermined event detected from the captured images. The process of processing the captured images in the reverse time series from the predetermined event is a process of processing captured images corresponding to each time point of the reverse time series in the order of the reverse time series.

Then, the information processing apparatus 100 sets the metadata for objects involved in the predetermined event and included in the captured images corresponding to each time point of the reverse time series.

As described above, examples of the objects involved in the predetermined event, "objects directly involved in the predetermined event," or "objects directly involved in the predetermined event and objects indirectly involved in the predetermined event". That is, the information processing apparatus 100 sets the metadata not only for the objects directly involved in the predetermined event but also for the objects indirectly involved in the predetermined event. In addition, as described above, the objects in which the metadata is set indicate the objects involved in the predetermined event.

Accordingly, when the information processing apparatus 100 sets the metadata for the objects involved in the predetermined event, not only the objects directly involved in the predetermined event but also the objects indirectly involved in the predetermined event can be identified. In addition, by identifying not only the objects directly involved in the predetermined event but also the objects indirectly involved in the predetermined event, it is easy to ascertain a whole picture of the event regarding how the event occurs, or the like.

Accordingly, the information processing apparatus 100 can assist with the ascertainment of the predetermined event detected on the basis of the captured images by performing a setting process as the process related to the information processing method according to the embodiment.

Note that the process related to the information processing method according to the embodiment is not limited to the above-described setting process.

For example, the information processing apparatus 100 can further perform "a process of editing the captured images on the basis of a set result of the metadata in the objects involved in the predetermined event in the setting process". Hereinafter, the process of editing the captured images on the basis of a set result of the metadata is referred to as "an editing process" in some cases.

In addition, the information processing apparatus 100 can further perform, for example, "the process of controlling to display an image in which the objects involved in the predetermined event for which the metadata is set are shown on a display screen on the basis of a set result of the metadata for the objects involved in the predetermined event in the setting process". As will be described below, "the image in which the objects involved in the predetermined event for which the metadata is set are shown" may be an image edited in response to the editing process or may be an image not edited in the editing process. Examples of the display screen on which "the image in which the objects involved in the predetermined event for which the metadata is set are shown" is displayed include a display screen of the display device 300. Hereinafter, a process of controlling to display "the image in which the objects involved in the predetermined event for which the metadata is set are shown" on the display screen is referred to as "a display process" in some cases.

[1-4-2] Process Related to Information Processing Method According to Embodiment Next, a process related to the information processing method according to the embodiment performed by the information processing apparatus 100 will be described more specifically.

[1-4-2-1] First Example of Process Related to Information Processing Method: First Example of Setting Process The information processing apparatus 100 sets the metadata for objects included in captured images on the basis of the captured images. The information processing apparatus 100 processes the captured images in the reverse time series and sets the metadata for objects involved in the predetermined event among the objects included in the captured images.

Examples of the captured images processed in the reverse time series by the information processing apparatus 100 include "the captured images corresponding to each time point of the reverse time series during a period from a time point at which the predetermined event is detected to a time point at which a predetermined condition in the reverse time series is satisfied".

The predetermined condition related to the captured images processed in the reverse time series includes, for example, one or both of a temporal condition and a condition related to objects detected from captured images. Examples of the temporal condition include "processing the captured images from the time point at which the predetermined event is detected and before a preset period". The information processing apparatus 100 determines whether or not the temporal condition is satisfied, for example, by referring to a time stamp of the captured images or the like. In addition, examples of the condition related to the objects include "detection of presence of an object at a preset position or region" or "non-inclusion of the first object (an object directly involved in the predetermined event) in a captured image". The information processing apparatus 100 determines whether or not the condition related to the objects is satisfied, for example, by performing any object detection process on the captured images. Note that it goes without saying that the predetermined condition related to the captured images processed in the reverse time series is not limited to the above-described examples.

Note that the captured images processed in the reverse time series by the information processing apparatus 100 are not limited to the above-described examples. For example, the captured images which can be processed in the reverse time series by the information processing apparatus 100 may be "captured images which can be processed in the reverse time series from a time point at which the predetermined event is detected and corresponding to all the time points of the reverse time series".

For example, a time point corresponding to the captured image processed most recently among the captured images processed in the reverse time series by the information processing apparatus 100 corresponds to a start time point of the predetermined event. In addition, for example, a time point at which the predetermined event is detected corresponds to an end time point of the predetermined event.

As described above, the information processing apparatus 100 sets the metadata for each of the first object (an object directly involved in the predetermined event) and the second object (an object indirectly involved in the predetermined event). The information processing apparatus 100 sets the metadata for each of the first object and the second object, for example, by performing "a process to be described below in (A)" or "the process to be described below in (A) and a process to be described below in (B)".

(A)

If the predetermined event is detected from the captured images, the information processing apparatus 100 identifies the first object (the objects directly involved in the predetermined event) from the captured images in which the predetermined event is detected. Examples of the first object include "a ball" in a case where the predetermined event is a scoring event of soccer or "a person who is a perpetrator" in a case where the predetermined event is an event of a crime, or the like. The identified first object may be set for each event or may be estimated using a detection result of the predetermined event.

If the first object is identified, the information processing apparatus 100 sets metadata in the identified first object.

In addition, if the first object is identified, the information processing apparatus 100 processes the captured images in the reverse time series and identifies the second object (an object indirectly involved in the predetermined event). Here, a time point at which the second object is identified among the time points of the reverse time series can be defined as a time point at which a sub-event in the predetermined event occurs.

If the second object is identified, the information processing apparatus 100 sets metadata in the identified second object.

The information processing apparatus 100 identifies the second object, for example, by processing the captured images in the reverse time series and determining an object directly involved in the identified first object.

For example, the information processing apparatus 100 performs a process of determining the object directly involved with the first object on the captured images in which the first object is detected among the captured images at each time point of the reverse time series. The information processing apparatus 100 detects the first object from the captured images at each time point of the reverse time series, for example, by performing any object detection process on the captured images at each time point of the reverse time series.

In addition, for example, the information processing apparatus 100 may not perform the process of determining the object directly involved with the first object on the captured images in which the first object is not detected among the captured images at each time point of the reverse time series. As the information processing apparatus 100 does not perform the process of determining the object directly involved with the first object on the captured images in which the first object is not detected, a process load on the information processing apparatus 100 is reduced.

For example, the information processing apparatus 100 determines an object of which a distance from the first object is equal to or less than a predetermined threshold or an object of which a distance from the first object is less than the predetermined threshold as the object directly involved with the first object. A distance between objects is expressed with, for example, a Euclid distance between the position of one object in a captured image and the position of another object in the captured image. Note that the distance between objects is not limited to the Euclid distance and may be a distance calculated by any distance calculation method. The predetermined threshold related to the process of determining the object directly involved with the first object may be a preset fixed value or may be a variable value which can be changed on the basis of an operation or the like by a user.

Note that the process of determining the object directly involved with the first object is not limited to the above-described example. For example, the information processing apparatus 100 may determine the object directly involved with the first object in response to any process in which the involvement in the first object can be determined. A specific example of the process of determining the object directly involved with the first object will be described later. Hereinafter, the object directly involved with the first object (the object directly involved in the predetermined event) is referred to as "a third object" in some cases.

If the third object is determined, the information processing apparatus 100 sets the determined third object as the second object (the object indirectly involved in the predetermined event).

Figure 2:
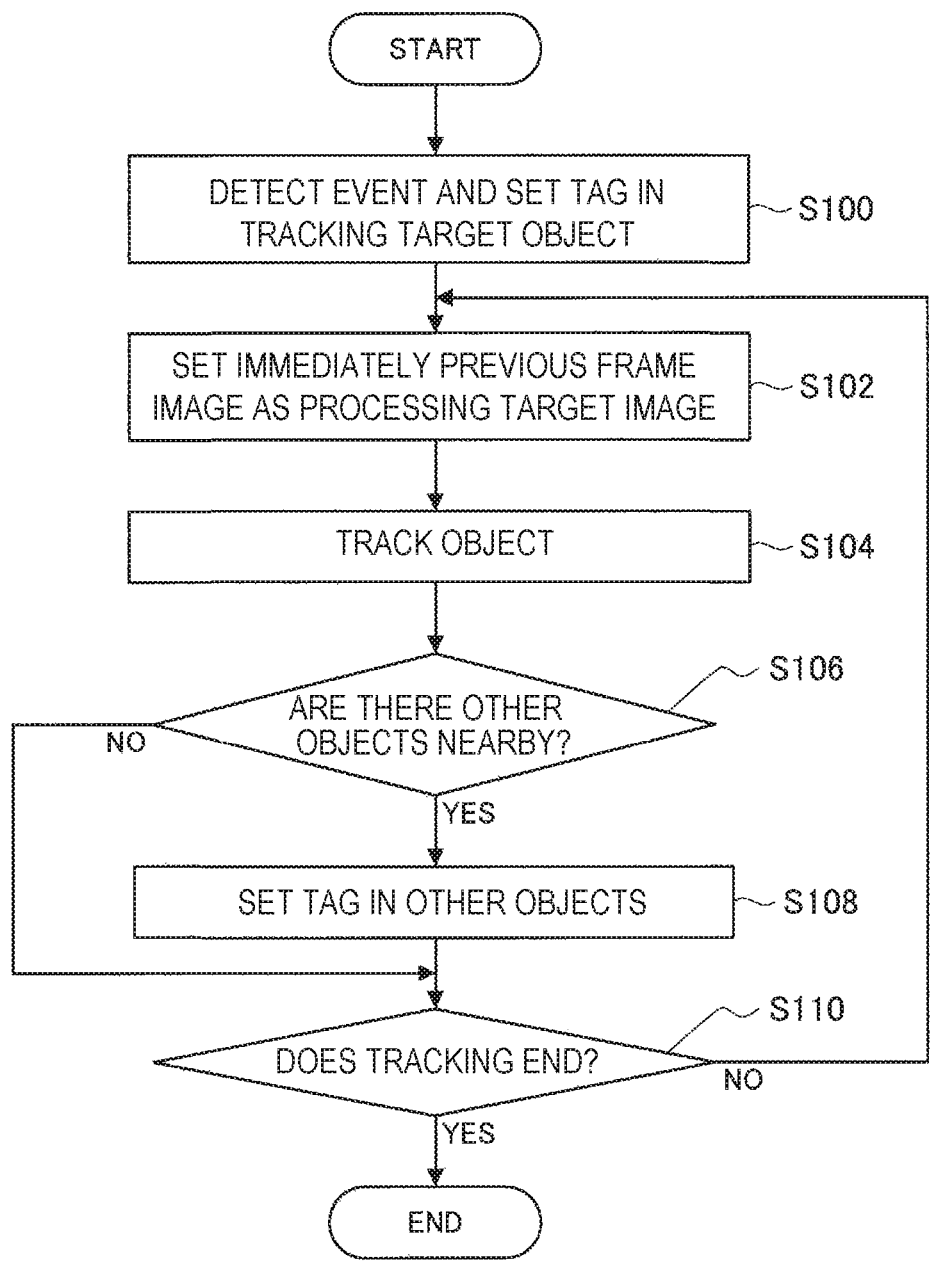
FIG. 2 is an explanatory flowchart illustrating a first example of a setting process related to an information processing method according to the embodiment.

FIG. 2 is an explanatory flowchart illustrating a first example of a setting process related to an information processing method according to the embodiment. FIG. 2 illustrates an example in which the information processing apparatus 100 sets a tag (an example of the metadata) in the object involved in the predetermined event. In addition, FIG. 2 illustrates an example in which the captured images processed by the information processing apparatus 100 are a moving image including a plurality of frame images (still images).

The information processing apparatus 100 detects an event and sets a tag in a tracking target object (S100). The process of step S100 corresponds to a process of setting the tag in the first object. Hereinafter, the tag set in the first object, such as the tag set in step S100, is referred to as "tag 1 of a first hierarchy" or simply referred to as "tag 1".

As described above, the event detection process may be performed by the information processing apparatus 100 or may be performed by an external apparatus of the information processing apparatus 100. In a case where the information processing apparatus 100 performs the event detection process, the information processing apparatus 100 performs the process of step S100 using a result of the performed event detection process. In addition, in a case where the external apparatus performs the event detection process, the information processing apparatus 100 performs the process of step S100 using a result of the event detection process in the external apparatus.

Examples of the tracking target object in which the tag is set in step S100 include "a ball" in a case where the predetermined event is a scoring event of soccer or "a person who is a perpetrator" in a case where the predetermined event is an event of a crime, or the like.

If the tag is set in the tracking target object in step S100, the information processing apparatus 100 sets the immediately previous frame image as a processing target captured image (S102).

The information processing apparatus 100 tracks the object in which the tag is set in step S100 (S104). Here, tracking of the object according to the embodiment is, for example, identifying a tracking target object from the captured images. The information processing apparatus 100 tracks the object in which the tag is set in step S100, for example, by performing any process in which the object can be tracked, such as "detecting the object in which the tag is set in step S100 from the captured images in response to any object detection process," "using the method disclosed in Patent Document 1," "using the method disclosed in Patent Document 2," or the like. In addition, the information processing apparatus 100 may track an object designated in response to an operation by a user designating the object to be tracked (which is an example of manual tracking).

The information processing apparatus 100 determines whether or not there is another object near the tracking target object (S106). The other object determined in step S106 corresponds to an object directly involved with the object in which the tag is set in step S100, that is, the third object (the object directly involved with the first object). In addition, the process of step S106 corresponds to a process of detecting occurrence of a sub-event.

For example, in a case where there is an object of which a distance from the object in which the tag is set in step S100 is equal to or less than a predetermined threshold or there is an object of which the distance is less than the predetermined threshold, the information processing apparatus 100 determines whether or not there are other objects near the tracking target object.

In a case where it is determined in step S106 that there are no other objects near the tracking target object, the information processing apparatus 100 performs a process of step S110 to be described below.

Conversely, in a case where it is determined in step S106 that there are the other objects near the tracking target object, the information processing apparatus 100 sets the tag in the other object (S108). The information processing apparatus 100 sets tag 1-m (where m is an integer equal to or greater than 1) of second hierarchy in each of the objects determined to be nearby the tracking target object in step S106. Whenever the objects which are near the tracking target object are determined, the information processing apparatus 100 sets different tags of the second hierarchy such as tag 1-1 of the second hierarchy, tag 1-2 of the second hierarchy, and the like of the second hierarchy.

In a case where it is determined in step S106 that there are no other objects near the tracking target object or the process of step S108 is performed, the information processing apparatus 100 determines whether or not the tracking of the tracking target object ends (S110). For example, in a case where a predetermined condition including one or both of the temporal condition and the condition related to the objects detected from the captured images is satisfied, the information processing apparatus 100 determines that the tracking of the tracking target object ends.

In a case where it is determined in step S110 that the tracking of the tracking target object does not end, the information processing apparatus 100 repeats the process from step S102. Conversely, in a case where it is determined in step S110 that the tracking of the tracking target object ends, the information processing apparatus 100 ends the process illustrated in FIG. 2.

The information processing apparatus 100 performs, for example, the process illustrated in FIG. 2 as the setting process according to the first example. By performing the process illustrated in FIG. 2, the tag is set in each of the first object and the third object directly related to the first object (an example of the second object).

Note that the example of the setting process according to the first example is not limited to the example illustrated in FIG. 2. For example, the information processing apparatus 100 may set the tags in the objects involved in the predetermined event and record a trajectory of movement of the object in which the tag is set. The trajectory of the movement of the object in which the tag is set is estimated from, for example, "a captured state of the imaging device 200 indicated by an angle of field, an azimuth angle, an angle of elevation, an angle of dip, zoom magnification, or the like" corresponding to each of the captured images and "the position of an object in the captured images". Note that it goes without saying that a method of estimating the trajectory of the movement of the object in which the tag is set is not limited to the above-described example. The recording of the trajectory of the movement of an object in which the tag is set corresponds to a tracking result of the object.

(B)

By performing the process of (A) above as the setting process, the metadata is set in each of the first object and the third object (an example of the second object). Note that the second object in which the metadata is set in the setting process (the object indirectly involved in the predetermined event) is not limited to the third object (the object directly involved with the first object).

For example, the information processing apparatus 100 identifies the second object, by processing the captured images in the reverse time series and determining an object directly involved in the identified third object. Then, the information processing apparatus 100 sets the metadata in the identified second object.

For example, the information processing apparatus 100 performs a process of determining the object directly involved with the third object on the captured images in which the third object is detected among the captured images at each time point of the reverse time series. The information processing apparatus 100 detects the third object from the captured images at each time point of the reverse time series, for example, by performing any object detection process on the captured images at each time point of the reverse time series.

In addition, for example, the information processing apparatus 100 may not perform the process of determining the object directly involved with the third object on the captured images in which the third object is not detected among the captured images at each time point of the reverse time series. As the information processing apparatus 100 does not perform the process of determining the object directly involved with the third object on the captured images in which the third object is not detected, a process load on the information processing apparatus 100 is reduced.

For example, the information processing apparatus 100 determines the object directly involved with the third object as in the process of determining the object directly involved with the first object. Hereinafter, an object directly involved with the third object (the object directly involved with the first object) is referred to as "a fourth object" in some cases.

If the fourth object is determined, the information processing apparatus 100 sets the determined fourth object as the second object (the object indirectly involved in the predetermined event).

Further, for example, the information processing apparatus 100 can also identify, as the second object, the object directly involved with the object identified as the second object by processing the captured images in the reverse time series such as "identifying the object directly involved with the identified fourth object as the second object" or the like.

Then, the information processing apparatus 100 sets the metadata in the identified second object.

Figure 3:
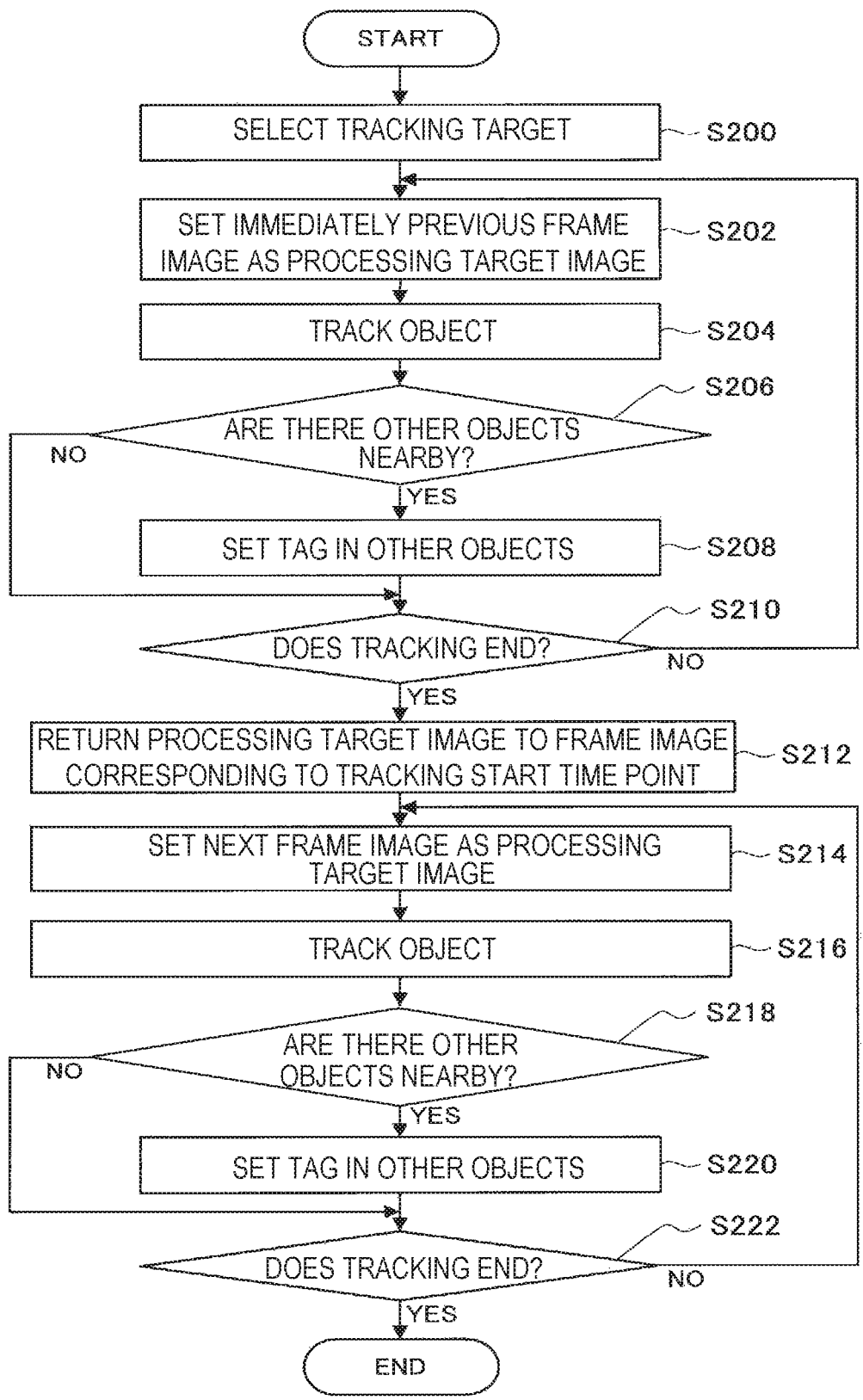
FIG. 3 is an explanatory flowchart illustrating the first example of a setting process related to an information processing method according to the embodiment.

FIG. 3 is an explanatory flowchart illustrating the first example of the setting process related to an information processing method according to the embodiment. A process illustrated in FIG. 3 is, for example, an example of a process on the object identified as the second object by processing the captured images in the reverse time series, such as the object in which the tag is set in the process illustrated in FIG. 2. Hereinafter, a case where the information processing apparatus 100 performs each process illustrated in FIG. 3 on each object in which tag 1-m of the second hierarchy is set in step S108 of FIG. 2 will be exemplified.

In addition, as in FIG. 2, FIG. 3 illustrates an example in which the information processing apparatus 100 sets a tag (an example of the metadata) in the object involved in the predetermined event. In addition, as in FIG. 2, FIG. 3 illustrates an example in which the captured images processed by the information processing apparatus 100 are a moving image including a plurality of frame images.

The information processing apparatus 100 selects the tracking target object (S200). The process of step S200 corresponds to a process of selecting a sub-event. For example, the information processing apparatus 100 selects the tracking target object from the objects in which tag 1-m of the second hierarchy is set in step S108 of FIG. 2. Note that the information processing apparatus 100 can also select, for example, any object identified as the second object such as the fourth object or the like as the tracking target object.

The information processing apparatus 100 sets an immediately previous frame image as a processing target captured image (S202). For example, in a case where the process of step S202 is performed after the process of step S200 is performed, for example, the information processing apparatus 100 sets a time point at which the tag is set in the tracking target object as a standard and sets an immediately previous frame image of a frame image corresponding to that time point as a processing target captured image. In addition, for example, in a case where a process of step S202 is performed after the process of step S210 to be described below is performed, the information processing apparatus 100 sets, for example, the immediately previous frame image of the frame image which is the processing target captured image as the processing target captured image.

The information processing apparatus 100 tracks the objects selected in step S200, for example, as in step S104 of FIG. 2 (S204).

The information processing apparatus 100 determines whether or not there are other objects near the tracking target object, for example, as in step S106 of FIG. 2 (S206). The other objects determined in step S206 correspond to the objects directly involved with the object selected in step S200.

In a case where it is determined in step S206 that there are no other objects near the tracking target object, the information processing apparatus 100 performs a process of step S210 to be described below.

Conversely, in a case where it is determined in step S206 that there are the other objects near the tracking target object, the information processing apparatus 100 sets the tag in the other object (S208). One of examples is a case where the object selected in step S200 is an object in which tag 1-m of the second hierarchy is set, the information processing apparatus 100 sets tag 1-m-n (where n is an integer equal to or greater than 1) of third hierarchy in each of the objects determined to be nearby the tracking target object in step S206. Whenever the objects which are near the tracking target object are determined, the information processing apparatus 100 sets different tags of the third hierarchy such as tag 1-m-1 of the third hierarchy, tag 1-m-2 of the third hierarchy, and the like of the third hierarchy.

In a case where it is determined in step S206 that there are no other objects near the tracking target object or the process of step S208 is performed, the information processing apparatus 100 determines whether or not the tracking of the tracking target object ends, for example, as in step S110 of FIG. 2 (S210).

In a case where it is determined in step S210 that the tracking of the tracking target object does not end, the information processing apparatus 100 repeats the process from step S202.

Conversely, in a case where it is determined in step S210 that the tracking of the tracking target object ends, the information processing apparatus 100 returns the processing target image to the frame image corresponding to the tracking start time point (S212). Examples of the frame image which is the processing target image in step S212 include a frame image corresponding to a time point at which the tag is set in the tracking target object.

The information processing apparatus 100 sets a next frame image (that is, an immediately next frame image) as the processing target captured image (S214). For example, in a case where the process of step S214 is performed after it is determined in the process of step S210 that the tracking of the tracking target object ends, for example, the information processing apparatus 100 sets a time point at which the tag is set in the tracking target object as a standard and sets an immediately next frame image of a frame image corresponding to that time point as a processing target captured image. In addition, for example, in a case where a process of step S214 is performed after the process of step S222 to be described below is performed, the information processing apparatus 100 sets, for example, the immediately next frame image of the frame image which is the processing target captured image as the processing target captured image. That is, the information processing apparatus 100 processes the captured images in a time series after step S214.

The information processing apparatus 100 tracks the objects selected in step S200, for example, as in step S104 of FIG. 2 (S216).

The information processing apparatus 100 determines whether or not there are other objects near the tracking target object, for example, as in step S106 of FIG. 2 (S218). The other objects determined in step S218 correspond to the objects directly involved with the object selected in step S200.

In a case where it is determined in step S218 that there are no other objects near the tracking target object, the information processing apparatus 100 performs a process of step S222 to be described below.

Conversely, in a case where it is determined in step S218 that there are the other objects near the tracking target object, the information processing apparatus 100 sets the tag in the other objects as in step S208 (S220).

In a case where it is determined in step S218 that there are no other objects near the tracking target object or the process of step S220 is performed, the information processing apparatus 100 determines whether or not the tracking of the tracking target object ends (S222). For example, in a case where a predetermined condition including one or both of the temporal condition and the condition related to the objects detected from the captured images is satisfied, the information processing apparatus 100 determines that the tracking of the tracking target object ends. That is, the information processing apparatus 100 determines whether or not the tracking of the tracking target object ends as in step S110 of FIG. 2, excluding the captured images processed in the time series.

In a case where it is determined in step S222 that the tracking of the tracking target object does not end, the information processing apparatus 100 repeats the process from step S214. Conversely, in a case where it is determined in step S222 that the tracking of the tracking target object ends, the information processing apparatus 100 ends the process illustrated in FIG. 3.

The information processing apparatus 100 can perform the process illustrated in FIG. 3 in addition to the process illustrated in FIG. 2 as the setting process according to the first example. By performing the process illustrated in FIG. 3, the tag is set in an object identified as the second object, such as the fourth object directly involved with the third object or the like.

Note that the example of the setting process according to the first example is not limited to the examples illustrated in FIGS. 2 and 3. For example, as described above, the information processing apparatus 100 may set the tag in the object involved in the predetermined event and record the trajectory of the movement of the object in which the tag is set.

The information processing apparatus 100 sets the metadata in the objects involved in the predetermined event, for example, by performing "the process described in (A) above" or "the process described in (A) above and the process described in (B) above".

Figure 4:
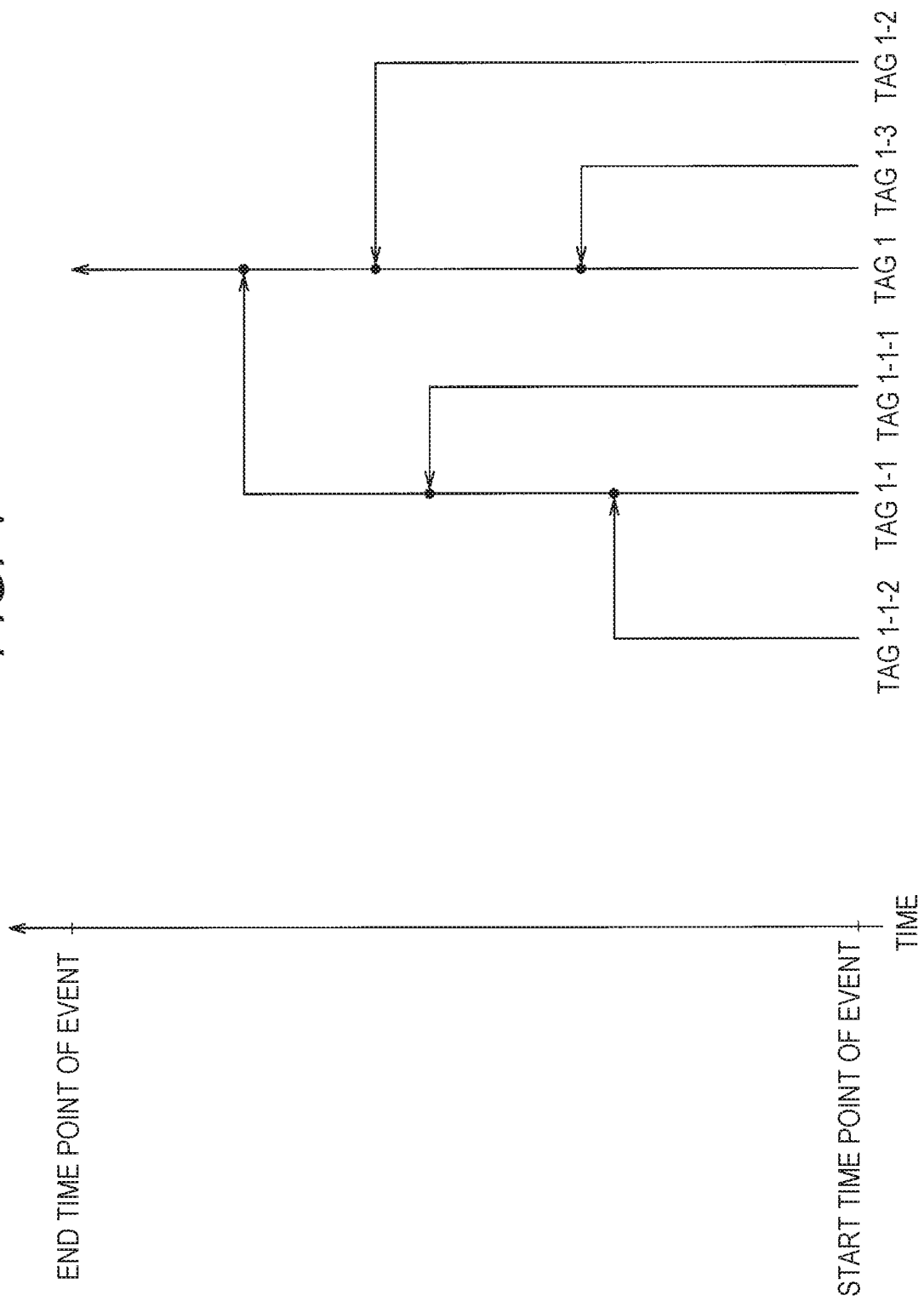
FIG. 4 is an explanatory diagram illustrating an example of a result of the first example of the setting process related to the information processing method according to the embodiment.

FIG. 4 is an explanatory diagram illustrating an example of a result of the first example of the setting process related to the information processing method according to the embodiment. FIG. 4 illustrates an example of results of "the process described in (A) above and the process described in (B) above" as a tree structure.

For example, by arranging the metadata set in each object and a time point at which the sub-event occurs, the result of the setting process can be expressed with a tree structure indicating relevance of the objects in which the metadata is set, as illustrated in FIG. 4.

Note that the setting process according to the first example is not limited to "the process described in (A) above" or "the process described in (A) above and the process described in (B) above".

For example, the information processing apparatus 100 can establish consistency of the objects in which the metadata is set by further performing a process to be described in (C) below.

(C)

The information processing apparatus 100 determines the same object in which different pieces of metadata are set among the objects involved in the predetermined event, the objects in which the metadata is set. Then, the information processing apparatus 100 integrates the different pieces of metadata set in the same object.

The integrating of the metadata according to the embodiment refers to "re-setting the metadata so that the same metadata is set in the objects which are determined to be the same object and in which different pieces of metadata are set". For example, in a case where hierarchy is provided in the metadata, the information processing apparatus 100 integrates the metadata by substituting a tag of deep hierarchy with a tag of shallow hierarchy. As a specific example, in a case where an object in which tag 1 of first hierarchy is set and an object in which tag 1-1-1 of third hierarchy is set are determined to be the same object, the information processing apparatus 100 substitutes tag 1-1-1 of the third hierarchy with tag 1 of the first hierarchy.

Examples of the method of determining the same object include a method of determining objects with the same trajectory, as will be described below.

For example, in a case where there are frame images of t frames in captured images from a start time point of the predetermined event to an end time point of the predetermined event, each of the objects in which the metadata is set has up to t positions of the object in the captured images. Here, the reason why each object has up to t positions is that all the objects in which the metadata is set are not necessarily be included in all the frame images of t frames.

The position of the object in the captured images is expressed with set coordinate values of a coordinate system, such as two-dimensional coordinates or the like at which any position in a captured image is the origin, as described above. In addition, for an object in which metadata not included in a frame image is set, for example, coordinate values outside of a frame image, such as (x, y)=(−1, −1) or the like, are set.

Hereinafter, an example of a method of determining the same object will be described giving an example in which an object in which tag 1 of the first hierarchy is set and an object in which tag 1-1-1 of the third hierarchy is set are the same object.

Coordinate values of the object in which tag 1 of the first hierarchy is set are assumed to be $(x_1(k), y_1(k))$ and coordinate values of the object in which tag 1-1-1 of the third hierarchy is set are assumed to be $(x_{1-1-1}(k), y_{1-1-1}(k))$. Here, k indicates a frame number. In addition, x indicates an x coordinate and y indicates a y coordinate.

The information processing apparatus 100 performs calculation expressed in, for example, Expression 1 below and obtains an error err of a position between the foregoing two objects.

[Math. 1]

$$\begin{cases} err = \dfrac{\sum (|x_1(k) - x_{1-1-1}(k)| + |y_1(k) - y_{1-1-1}(k)|) \cdot g(k)}{\sum g(k)} \\ g(k) = \text{sgn}(x_1(k) + 1) \cdot \text{sgn}(x_{1-1-1}(k) + 1) \end{cases}$$ (Expression 1)

Here, sgn(x) expressed in Expression 1 above is a sign function that takes −1 in the case of x<0, takes 0 in the case of x=0, and takes 1 in the case of x>1. In addition, as described above, for example, coordinate values outside of a frame image, such as (x, y)=(−1, −1) or the like, are set in an object not included in a frame image. Accordingly, in a case where the object is included in the frame image, a sign function sgn (x+1) indicates 1. Conversely, in a case where the object is not included in the frame image, the sign function sgn (x+1) indicates 0.

That is, the error err obtained by the foregoing Expression 1 is a value obtained by dividing "a sum of absolute values of differences in coordinates in a case where the positions of two objects compared with each other are all in the frame images" by "the total number of frame images in which the positions of the two objects compared with each other are all in the frame images".

Note that in Expression 1 above, the error err is calculated with a sum of absolute values of differences, but the method of calculating the error err is not limited to Expression 1 above. For example, the information processing apparatus 100 may calculate the error err in accordance with a sum of squares of differences, normalized correlation, or the like.

The same object in which the different pieces of metadata are set ought to have the same trajectory in the captured images. Accordingly, the information processing apparatus 100 determines the same object in which the different pieces of metadata are set by comparing the error err with the set threshold. For example, in a case where the error err is equal to or less than a set threshold or the error err is less than the set threshold, the information processing apparatus 100 determines that the objects are the same object in which the different pieces of metadata are set.

The threshold related to the determination of the same object in which the different pieces of metadata are set may be a preset fixed value or may be a variable value which can be changed in response to an operation or the like of a user of the information processing apparatus according to the embodiment.

Figure 5:
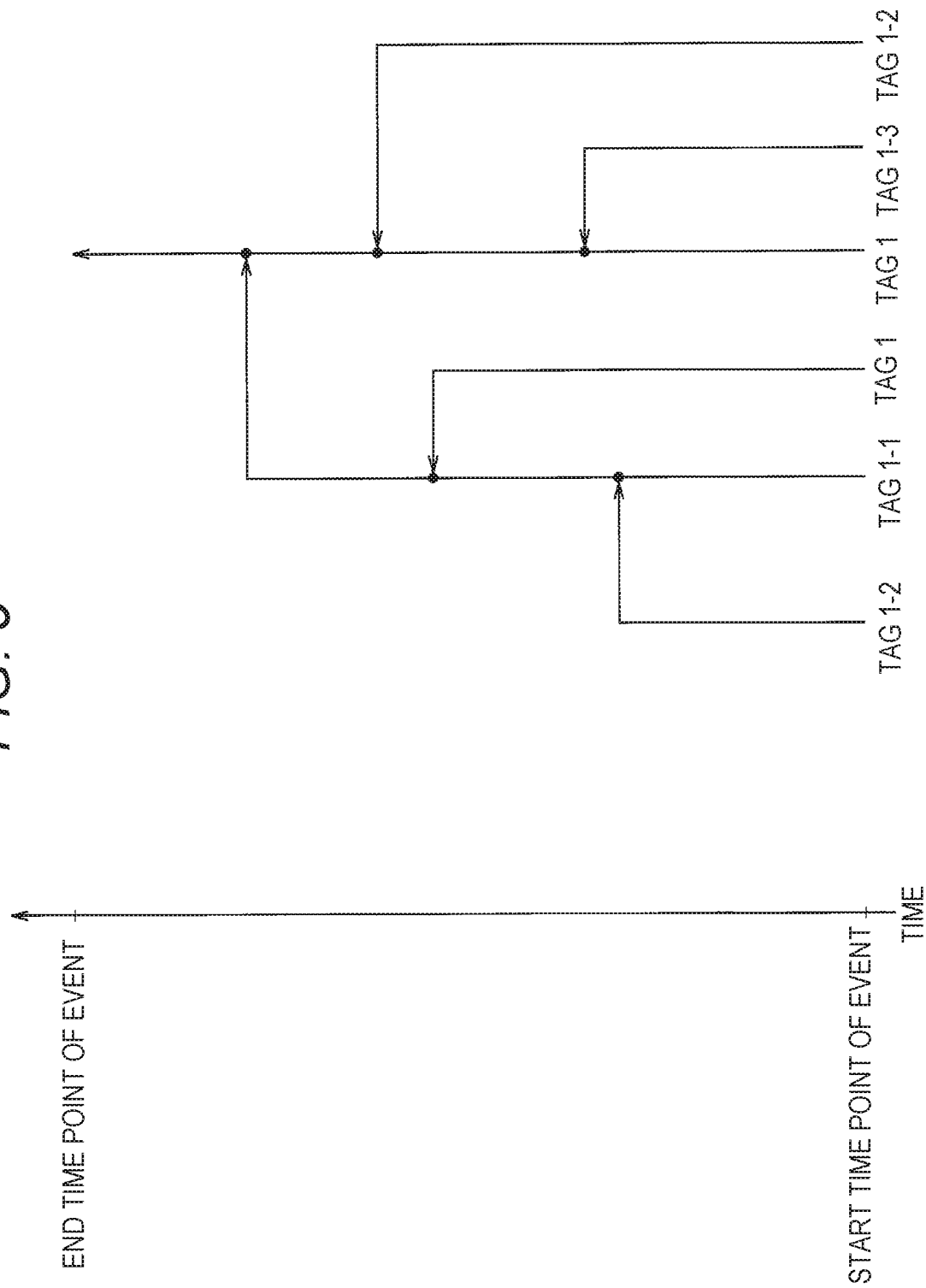
FIG. 5 is an explanatory diagram illustrating another example of the result of the first example of the setting process related to the information processing method according to the embodiment.

FIG. 5 is an explanatory diagram illustrating another example of the result of the first example of the setting process related to the information processing method according to the embodiment. FIG. 5 illustrates an example of a result obtained by further performing the process described in (C) above as a tree structure with regard to the results obtained by performing "the process described in (A) above and the process described in (B) above" indicated with the tree structure of FIG. 4.

For example, if FIGS. 4 and 5 are compared, it can be comprehended that tag 1-1-1 of the third hierarchy illustrated in FIG. 4 is substituted with tag 1 of the first hierarchy by further performing the process described in (C) above.

Accordingly, by further performing the process described in (C) above, it is possible to obtain relevance of the objects in which the metadata is set more accurately.

[1-4-2-2] Second Example of Process According to Information Processing Method: Second Example of Setting Process In the setting process related to the foregoing first example, the end time point of the predetermined event has been set as the time point at which the predetermined event is detected, and the metadata has been set in the objects involved in the predetermined event.

However, the end time point of the predetermined event is not limited to the time point at which the predetermined event is detected. For example, the information processing apparatus 100 may set the metadata in the objects included in the captured images corresponding to time points after the predetermined event is detected. By setting the metadata, as described above, it is possible to control to more easily ascertain how a person involved in the predetermined event, such as a player after scoring in sports such as soccer, a person committing an accident or a crime, or the like, takes a certain action after the predetermined event is detected.

Accordingly, the information processing apparatus 100 sets the metadata in the objects involved in the predetermined events by further processing the captured images in the time series from the predetermined event in addition to the setting process related to the foregoing first example. That is, the information processing apparatus 100 sets the metadata in the objects involved in the predetermined event by processing the captured images in the reverse time series from the predetermined event and processing the captured images in the time series from the predetermined event.

Examples of the captured images processed in the time series by the information processing apparatus 100 include "the captured images corresponding to each time point of the time series during a period from a time point at which the predetermined event is detected to a time point at which a predetermined condition in the time series is satisfied".

The predetermined condition related to the captured images processed in the time series includes, for example, one or both of a temporal condition and a condition related to objects detected from captured images. Examples of the temporal condition include "processing the captured images from the time point at which the predetermined event is detected and after a preset period". The information processing apparatus 100 determines whether or not the foregoing temporal condition is satisfied by referring to a time stamp or the like of the captured images, for example, as in the determination of the temporal condition related to the captured images processed in the reverse time series. In addition, the condition related to the objects is similar to, for example, the condition related to the objects involved in the captured images processed in the reverse time series. The information processing apparatus 100 determines whether or not the condition related to the objects is satisfied, for example, as in the determination of the condition related to the objects involved in the captured images processed in the reverse time series. Note that it goes without saying that the predetermined condition related to the captured images processed in the time series is not limited to the above-described example.

Note that the captured images processed in the time series are not limited to the above-described examples. For example, the captured images which can be processed in the time series by the information processing apparatus 100 may be "captured images which can be processed in the time series from a time point at which the predetermined event is detected and corresponding to all the time points of the time series".

For example, a time point corresponding to the captured image processed most recently among the captured images processed in the reverse time series by the information processing apparatus 100 corresponds to a start time point of the predetermined event. In addition, for example, of the captured images processed in the time series by the information processing apparatus 100, a time point corresponding to the most recently processed captured image corresponds to the end time point of the predetermined event.

The process related to the setting of the metadata in the setting process according to the second example is similar to the setting process according to the foregoing first example except that the range of the processing target captured images is different.

Figure 6:
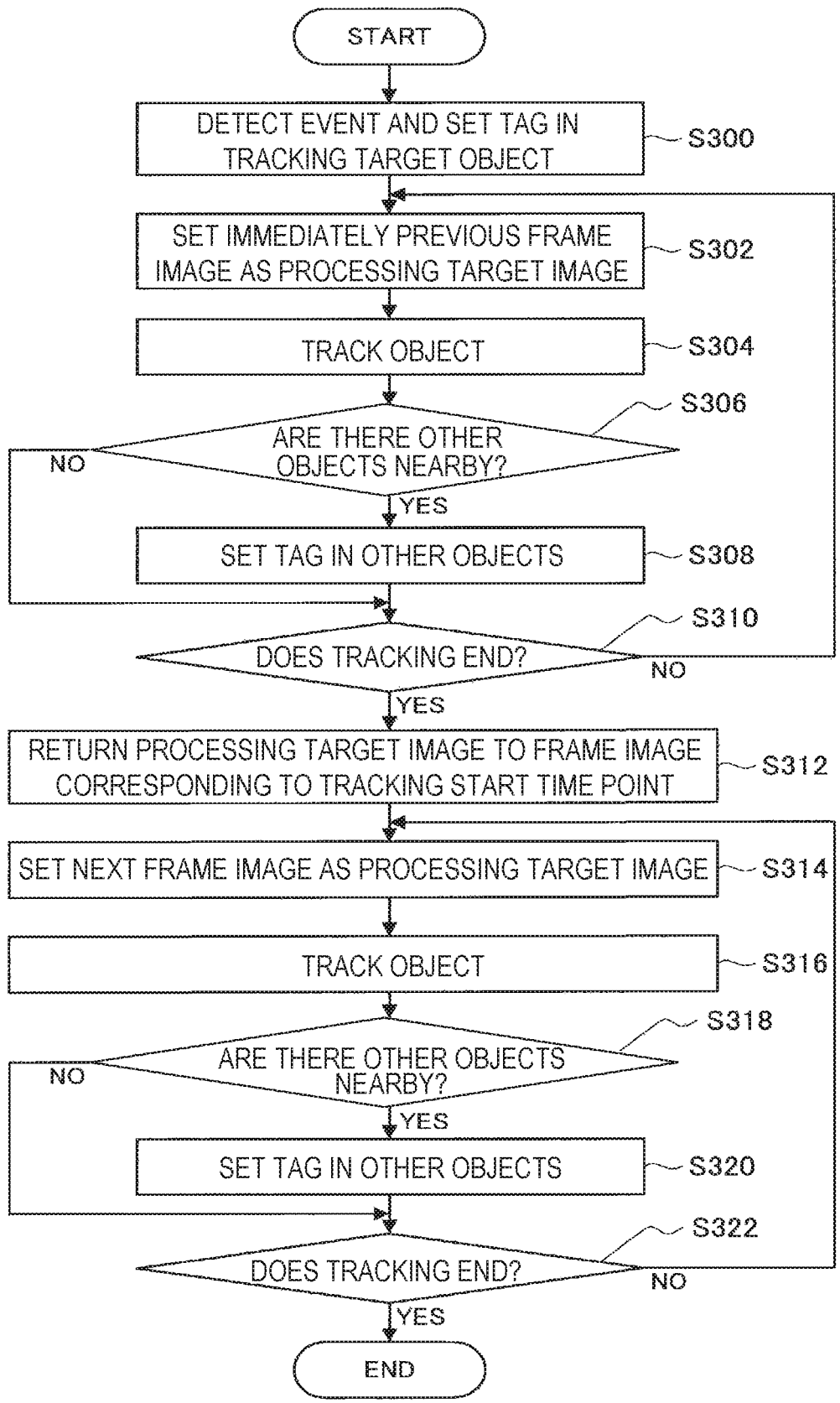
FIG. 6 is an explanatory flowchart illustrating a second example of a setting process related to an information processing method according to the embodiment.

FIG. 6 is an explanatory flowchart illustrating a second example of a setting process related to an information processing method according to the embodiment. FIG. 6 illustrates an example in which the information processing apparatus 100 sets a tag (an example of the metadata) in the object involved in the predetermined event. In addition, FIG. 6 illustrates an example in which the captured images processed by the information processing apparatus 100 are a moving image including a plurality of frame images.

The information processing apparatus 100 detects an event and sets the tag in the tracking target object as in step S100 illustrated in FIG. 2 (S300). The process of step S300 corresponds to the process of setting the tag in the first object.

If the tag is set in the tracking target object in step S300, the information processing apparatus 100 sets the immediately previous frame image as a processing target captured image (S302).

The information processing apparatus 100 tracks the objects in which a tag is set in step S300, for example, as in step S104 of FIG. 2 (S304).

The information processing apparatus 100 determines whether or not there is another near the tracking target object, as in step S106 illustrated in FIG. 2 (S306). The other objects determined in step S306 correspond to the third object (an object directly involved with the first object).

In a case where it is determined in step S306 that there are no other objects near the tracking target object, the information processing apparatus 100 performs a process of step S310 to be described below.

Conversely, in a case where it is determined in step S306 that there are the other objects near the tracking target object, the information processing apparatus 100 sets the tag in the other objects as in step S108 illustrated in FIG. 2 (S308).

In a case where it is determined in step S306 that there are no other objects near the tracking target object or the process of step S308 is performed, the information processing apparatus 100 determines whether or not the tracking of the tracking target object ends as in step S110 of FIG. 2 (S310).

In a case where it is determined in step S310 that the tracking of the tracking target object does not end, the information processing apparatus 100 repeats the process from step S302.

Conversely, in a case where it is determined in step S310 that the tracking of the tracking target object ends, the information processing apparatus 100 returns the processing target image to the frame image corresponding to the tracking start time point (S312). Examples of the frame image which is the processing target image in step S312 include a frame image corresponding to a time point at which the event is detected.

The information processing apparatus 100 sets a next frame image (that is, an immediately next frame image) as the processing target captured image (S314). For example, in a case where the process of step S314 is performed after it is determined in the process of step S310 that the tracking of the tracking target object ends, for example, the information processing apparatus 100 sets an immediately next frame image of a frame image corresponding to a time point at which an event is detected, for example, as a processing target captured image. In addition, for example, in a case where a process of step S314 is performed after the process of step S322 to be described below is performed, the information processing apparatus 100 sets, for example, the immediately next frame image of the frame image which is the processing target captured image as the processing target captured image. That is, the information processing apparatus 100 processes the captured images in a time series after step S314.

The information processing apparatus 100 tracks the objects selected in step S300, for example, as in step S104 of FIG. 2 (S316).

The information processing apparatus 100 determines whether or not there is another near the tracking target object, as in step S106 of FIG. 2, for example (S318). The other objects determined in step S318 correspond to the third object (an object directly involved with the first object).

In a case where it is determined in step S318 that there are no other objects near the tracking target object, the information processing apparatus 100 performs a process of step S322 to be described below.

Conversely, in a case where it is determined in step S318 that there are the other objects near the tracking target object, the information processing apparatus 100 sets the tag in the other objects as in step S308 (S320).

In a case where it is determined in step S318 that there are no other objects near the tracking target object or the process of step S320 is performed, the information processing apparatus 100 determines whether or not the tracking of the tracking target object ends, for example, as in step S222 of FIG. 3 (S322).

In a case where it is determined in step S322 that the tracking of the tracking target object does not end, the information processing apparatus 100 repeats the process from step S314. Conversely, in a case where it is determined in step S322 that the tracking of the tracking target object ends, the information processing apparatus 100 ends the process illustrated in FIG. 6.

The information processing apparatus 100 performs, for example, the process illustrated in FIG. 6 as the setting process according to the second example. By performing the process illustrated in FIG. 6, the tag is set in each of the first object and the third object directly related to the first object (an example of the second object).

Note that the example of the setting process according to the second example is not limited to the example illustrated in FIG. 6.

For example, the information processing apparatus 100 may further perform the process illustrated in FIG. 3.

In addition, for example, the information processing apparatus 100 may set the tag in the objects involved in the predetermined event and record the trajectory of the movement of the objects in which the tag is set.

[1-4-2-3] Third Example of Process According to Information Processing Method: Third Example of Setting Process In the setting process according to the foregoing first example and the setting process according to the foregoing second example, the process of setting the metadata has been performed on the objects included in the captured images captured in the time series by one imaging device 200. However, as described above, the information processing system according to the embodiment can include the plurality of imaging devices 200.

Accordingly, "a process of setting the metadata in objects involved in the predetermined event on the basis of captured images captured by the plurality of imaging devices 200" will be described as the third example of the setting process.

FIGS. 7A, 7B, and 7C are explanatory diagrams illustrating the third example of the setting process related to the information processing method according to the embodiment. FIG. 7A shows an example in which each of two imaging devices 200A and 200B images a soccer field. FIG. 7B shows an example of a captured image in which the imaging device 200A images a player O (an example of an object). In addition, FIG. 7C shows an example of a captured image in which the imaging device 200B images the player O.

Hereinafter, the third example of the setting process will be described appropriately with reference to FIGS. 7A, 7B, and 7C.

The information processing apparatus 100 processes the captured images for each imaging device 200 and sets the metadata in the objects involved in the predetermined event for each imaging device 200. For example, the information processing apparatus 100 sets the metadata by performing the setting process according to the foregoing first example or the setting process according to the foregoing second example on the captured image captured by each of the plurality of imaging devices 200.

In addition, the information processing apparatus 100 may associates the objects involved in the predetermined event for which the metadata is set for each imaging device 200.

In a case where the metadata set on the basis of the captured image captured by each of the plurality of imaging devices 200 is associated, the information processing apparatus 100 associates the metadata using, for example, an evaluation function such as Expression 1 above in the setting process according to the foregoing first example.

Here, the association of the metadata in the setting process according to the third example is association of the metadata set on the basis of the captured images captured by the different imaging devices 200 unlike the association of the metadata in the setting process according to the foregoing first example.

Accordingly, for example, the information processing apparatus 100 performs coordinate conversion of the position of the object in the captured image captured by each of the plurality of imaging devices 200 into coordinates of a common coordinate system. Then, the information processing apparatus 100 associates the metadata by the evaluation function as in Expression 1 above using the position of the object after the coordinate conversion.

The coordinate conversion of the position of the object in the captured image captured by each of the plurality of imaging devices 200 can be performed, for example, on the basis of an imaging state of the imaging device 200 at each time point. The imaging state of the imaging device 200 at each time point is expressed in addition to, for example, an imaging angle (for example, an azimuth angle, an angle of elevation, or an angle of dip) with respect to an imaging target, such as an angle of field, a field, and the like. For example, if an angle of field of the imaging device 200 at each time point and an imaging angle with respect to the imaging target are known, the position of the object can be converted into coordinates on a planar map if the imaging target such as a field or the like is viewed immediately above or diagonally above. Note that the example of the coordinate conversion of the position of the object in the captured images is not limited to the above-described example. The information processing apparatus 100 may convert the position of the object in the captured images in response to any process capable of performing coordinate conversion into coordinates of the common coordinate system.

If the metadata in the setting process according to the third example is associated, for example, the information processing apparatus 100 record relevance to the metadata set in the associated other objects for each piece of set metadata.

For example, the information processing apparatus 100 records the relevance to the associated other metadata in a table (or a database) of each piece of set metadata. As a specific example, in a case where an object in which tag A-1 of second hierarchy in an imaging device 200A is set and an object in which tag B-1 of the second hierarchy in an imaging device 200B is set are determined to be the same object, the information processing apparatus 100 records tag B-1 in a table corresponding to tag A-1 and records tag A-1 in a table corresponding to tag B-1.

For example, by "recording the relevance to the metadata set in the associated other objects for each piece of set metadata," as described above, it is possible to extract correlation of the metadata between the plurality of imaging devices 200 more easily.

Note that the information processing apparatus 100 may integrate the associated metadata, for example, in response to the process described in (C) above in the setting process according to the foregoing first example.

[1-4-2-4] Fourth Example of Process According to Information Processing Method: Fourth Example of Setting Process "The process of setting the metadata in the objects involved in the predetermined event on the basis of the captured images captured by the plurality of imaging devices 200" is not limited to the setting process according to the foregoing third example.

In the setting process according to the foregoing third example, the coordinates of the position of the object in the captured image captured by each of the imaging devices 200 have been converted into coordinates of the common coordinate system. Here, if a conversion expression for coordinate conversion in each of the imaging devices 200 is comprehended, the coordinate conversion can be performed from the coordinates of the common coordinate system to the coordinates of the coordinate system corresponding to the position of the object in the captured image captured by each of the imaging device 200. Hereinafter, as described above, "the coordinate conversion performed from the coordinates of the common coordinate system to the coordinates of the coordinate system corresponding to the position of the object in the captured images captured by the imaging device 200" is referred to as "reverse coordinate conversion" in some cases.

Accordingly, the information processing apparatus 100 first sets the metadata in the objects involved in the predetermined event on the basis of the captured images captured by some imaging devices 200 of the plurality of imaging devices 200. Some imaging devices 200 may be one imaging device 200 or may be two or more imaging devices 200. The information processing apparatus 100 sets the metadata by performing the setting process according to the foregoing first example or the setting process according to the foregoing second example.

Subsequently, the information processing apparatus 100 sets the metadata in the objects involved in the predetermined event on the basis of a set result of the metadata based on the captured images captured by some imaging devices 200 described above and the captured images captured by the remaining imaging devices 200 of the plurality of imaging devices 200.

More specifically, the information processing apparatus 100 performs the coordinate conversion from the coordinates of the position of the object in which the metadata is set into the coordinates of the common coordinate system on the basis of the captured images captured by some imaging devices 200 described above, for example, as in the setting process according to the foregoing third example. The information processing apparatus 100 performs the reverse coordinate conversion to the coordinates of the coordinate system corresponding to the position of the object in the captured images captured by the remaining imaging devices 200 from the coordinates of the position of the object which have been converted into the coordinates of the common coordinate system in response to the coordinate conversion by using the conversion expression for coordinate conversion in the remaining imaging devices 200.

Here, some imaging devices 200 describe above and the remaining imaging devices 200 are different imaging devices 200. That is, it is considered that there is a considerable difference in an imaging state at each time point between some imaging devices 200 described above and the remaining imaging devices 200. Therefore, the position of the object corresponding to a result obtained by performing the reverse coordinate conversion may not necessarily be constantly in the captured images captured by the remaining imaging devices 200.

In a case where the position of the object which is the result obtained by performing the reverse coordinate conversion is in the captured images captured by the remaining imaging devices 200, the information processing apparatus 100 sets the metadata in the object corresponding to the position of the object corresponding to the result obtained by performing the reverse coordinate conversion and included in the captured images.

In the setting process according to the fourth example, the metadata is set in only the captured images captured by some imaging devices 200 described above in response to the setting process according to the foregoing first example or the setting process according to the foregoing second example. In addition, a process load related to the process related to the reverse coordinate conversion is lower than a process load of each of the setting process according to the foregoing first example and the setting process according to the foregoing second example.

Accordingly, in a case where the setting process according to the fourth example is performed, a process load related to the setting process can be further reduced than in a case where the setting process according to the third example is performed.

The information processing apparatus 100 sets the metadata in the objects involved in the predetermined event, for example, by performing any process among the setting process according to the foregoing first example to the setting process according to the foregoing fourth example.

Hereinafter, as another example of the process according to the information processing method, a process using the set result of the metadata regarding the objects involved in the predetermined event in the setting process will be described.

[1-4-2-5] Fifth Example of Process According to Information Processing Method: Example of Editing Process The information processing apparatus 100 edits the captured images on the basis of the set result of the metadata regarding the objects involved in the predetermined event in the setting process.

For example, as illustrated in FIGS. 4 and 5, by setting the metadata in response to the setting process, it is possible to obtain relevance of the objects in which the metadata is set, that is, the relevance of the objects involved in the predetermined event. Accordingly, by editing the captured images on the basis of the set result of the metadata in the setting process, the captured images can be edited using the relevance of the objects involved in the predetermined event.

In addition, the information processing apparatus 100 may display the edited image on a display screen of the display device 300 or may record the edited image in the storage device 400. In addition, the information processing apparatus 100 may transmit the edited image to an external apparatus such as a server or the like.

For example, in a case where a soccer field is imaged by the imaging device 200 as in an example illustrated in FIGS. 7A, 7B, and 7C, the soccer field is imaged at an angle of field at which the entire field can be looked over in many cases. In the case where the soccer field is imaged at the angle of field at which the entire field can be looked over, there is the advantage that a whole play including a plurality of players can be imaged. However, there is the disadvantage that players involved with a ball or a play become small.

For example, optical zoom in the imaging device 200 can realize imaging players involved with a ball or a play largely. Here, the optical zoom is a zoom scheme of changing zoom magnification by operating a zoom lens included in an optical system and changing a focal distance of the zoom lens.

However, in a case where the optical zoom is used, only players involved with a ball or a play can be imaged.

Accordingly, the information processing apparatus 100 edits the captured images in response to image processing including one or both of electronic zoom for the captured images and a combination of a plurality of images based on the captured images.

The electronic zoom is a zoom scheme of changing zoom magnification by performing image processing on an image without moving a lens included in an optical system. In a case where the electronic zoom is performed, a partial region of an image is cut and various processes such as an interpolation process or the like are appropriately performed on the cut region, and then an image of the region is expanded.

Examples of a plurality of images based on the captured images include a plurality of images cut from the captured images captured by one imaging device 200 (for example, a plurality of images cut from the same frame image or a plurality of image cut from different frame images). In addition, the plurality of images based on the captured images may be a plurality of captured images captured by the plurality of imaging devices 200 (images cut from the captured images can also be included).

Examples of the combination of the plurality of images include any image processing capable of combining a plurality of images, such as alpha composition, overlapping of a plurality of images, pasting of a plurality of images, cutting and pasting of images, or the like. In addition, the combination of the plurality of images may include, for example, image processing in a format in which a plurality of images is simultaneously displayed if the images are displayed on a display screen, such as a combination process of realizing picture-in-picture or the like.

FIGS. 8A, 8B, 8C, and 8D are explanatory diagrams illustrating an example of an editing process related to the information processing method according to the embodiment. Each of FIGS. 8A, 8B, 8C, and 8D corresponds to a result of the editing process in a case where a soccer field is imaged by the imaging device 200.

For example, in a case where one player keeps retaining a ball for a period equal to or greater than a set length, the information processing apparatus 100 expands the player in response to the electronic zoom, as illustrated in FIG. 8A.

In addition, in a case where a sub-event such as approaching to a player retaining a ball by another player, passing of a ball to another player by a player retaining the ball, or the like occurs, the information processing apparatus 100 expands a cutting range in the electronic zoom so that a player involved in the sub-event is included in the image after the editing, as illustrated in FIG. 8B. With reference to the set metadata, the information processing apparatus 100 expands the cutting range in the electronic zoom at a time point earlier than a time point at which the sub-event occurs. In addition, with reference to the set metadata, the information processing apparatus 100 may set the cutting range of the electronic zoom from the position of a player or a ball at a time point later than a time point at which the sub-event occurs.

As described above, by performing the electronic zoom using the set metadata, the captured images can be edited so that the captured images include not only the player involved in the play but also a player involved in the play in the near future.

In a case where the editing process is performed, a fixed period which is set in advance can be exemplified as a period going back from the time point at which the sub-event occurs. In addition, the period going back from the time point at which the sub-event occurs may be a variable period such as until a condition related to the objects involved in the sub-event is satisfied, or the like. Examples of the condition related to the objects involved in the sub-event include a condition related to a distance between the objects involved in the sub-event such as until a certain distance of the player involved in the sub-event to the ball, or the like. In addition, the condition related to the objects involved in the sub-event may be a condition in which a plurality of conditions such as "until a fixed period set in advance passes, until a condition related to the distance between the objects involved in the sub-event, or the like is satisfied" is combined.

In sports such as soccer or the like, the position of a ball is considerably changed abruptly due to a long pass or the like in some cases. If the electronic zoom is performed in the foregoing case, the cutting range of the electronic zoom can be expanded and a ball or players can become small.

Accordingly, the information processing apparatus 100 edits the captured images by combining a plurality of images, for example, as illustrated in FIG. 8C or FIG. 8D. For example, the information processing apparatus 100 separately cuts an image of a player involved in the current play and an image of a player involved in the play in the near future, performs the electronic zoom, and combines the plurality of images. In addition, the information processing apparatus 100 can also combine an image obtained by imaging the whole field and the image cut in the electronic zoom. The combined images may be two images, as illustrated in FIG. 8C or may be three or more images, as illustrated in FIG. 8D.

Note that, as described above, the plurality of images based on the captured images can include the captured images captured by the plurality of imaging devices 200. For example, in a case where sports is imaged by the plurality of imaging devices 200, there is the imaging device 200 that expands and images a player involved in a play by optical zoom in some cases apart from the imaging device 200 that images the whole field in some cases. Accordingly, in a case where the images are combined on the basis of the captured images captured by the plurality of imaging devices 200, the captured images expanded by the optical zoom may be used depending on a situation of the play.

[1-4-2-6] Sixth Example of Process According to Information Processing Method: Example of Display Process The information processing apparatus 100 controls to display images in which the objects involved in the predetermined event for which the metadata is set are shown on a display screen on the basis of the set result of the metadata regarding the objects involved in the predetermined event. The information processing apparatus 100 controls to display the images in which the objects involved in the predetermined event for which the metadata is set are shown on the display screen of the display device 300, for example, by transmitting a control signal including a display command and signals indicating the images controlled to be displayed to the display device 300.

Examples of the images in which the objects involved in the predetermined event for which the metadata is set are shown include "captured images in which the objects in which the metadata is set are shown" and "images which are edited in response to the editing process and in which the objects in which the metadata is set are shown".

Figure 9A:
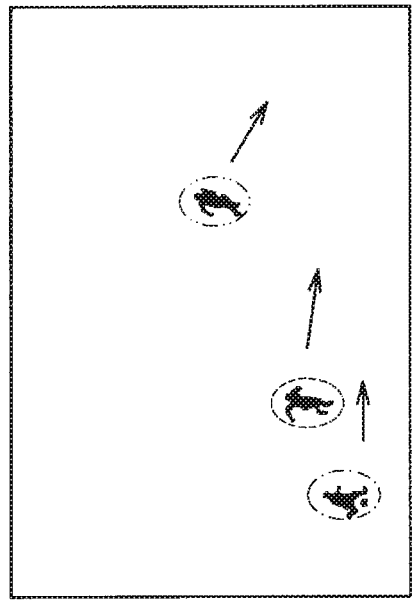
FIGS. 9A, 9B, 9C, and 9D are explanatory diagrams illustrating an example of a display process related to the information processing method according to the embodiment.
Figure 9B:
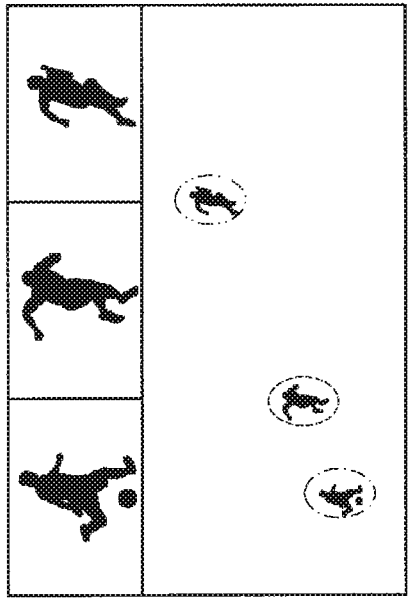
Figure 9C:
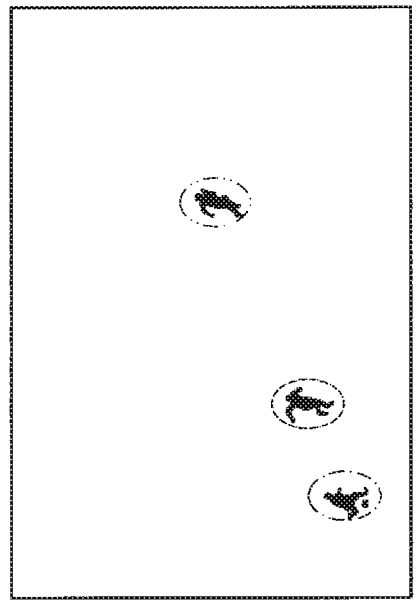
Figure 9D:
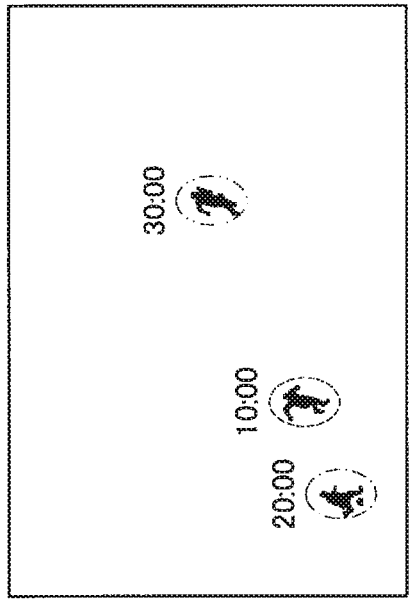

FIGS. 9A, 9B, 9C, and 9D are explanatory diagrams illustrating an example of a display process related to the information processing method according to the embodiment. Each of FIGS. 9A, 9B, 9C, and 9D corresponds to an image displayed on a display screen in response to a display process in a case where a soccer field is imaged by the imaging device 200. Each of FIGS. 9A, 9B, 9C, and 9D illustrate an example of "a captured image indicating an object in which the metadata is set," and FIG. 9D illustrates an example of "an image which is edited in response to the editing process and in which the objects in which the metadata is set are shown".

The objects in which the metadata is set are clarified as follows, for example. Note that it goes without saying that the method of indicating the objects in which the metadata is set is not limited to the following examples.

Line type of display objects corresponding to the metadata are controlled to be displayed at positions corresponding to the objects in which the metadata is set (FIGS. 9A, 9B, 9C, and 9D).

Display objects of color corresponding to the metadata are controlled to be displayed at positions corresponding to the objects in which the metadata is set.

Display objects of forms corresponding to the metadata are controlled to be displayed at positions corresponding to the objects in which the metadata is set.

Display objects of line thicknesses corresponding to the metadata are controlled to be displayed at positions corresponding to the objects in which the metadata is set.

Display objects in which the objects in which the metadata is set indicate future movement directions are controlled to be displayed at positions corresponding to the objects in which the metadata is set (FIG. 9B).

Display objects indicating a time until an event or a sub-event occurs are controlled to be displayed at positions corresponding to the objects in which the metadata is set (FIG. 9C).

A combination of two or more of the foregoing displays.

For example, the information processing apparatus 100 controls to constantly display images in which the objects involved in the predetermined event for which the metadata is set are shown, as illustrated in FIGS. 9A, 9B, 9C, and 9D.

In addition, for example, the information processing apparatus 100 may switch whether or not the images in which the objects involved in the predetermined event for which the metadata is set are shown, as illustrated in FIGS. 9A, 9B, 9C, and 9D, are controlled to be displayed on the display screen.

For example, the information processing apparatus 100 switches whether or not the images in which the objects involved in the predetermined event for which the metadata is set are shown are controlled to be displayed on the display screen on the basis of display setting information stored in a recording medium such as a storage unit (to be described below) or the like.

Examples of the display setting information include a flag indicating whether or not the images in which the objects involved in the predetermined event for which the metadata is set are shown are controlled to be displayed on the display screen. In addition, the display setting information may be any type of data in which whether or not the images in which the objects involved in the predetermined event for which the metadata is set are shown are controlled to be displayed on the display screen and a method of indicating the objects in which the metadata is set are regulated. Content indicated by the display setting information can be changed on the basis of, for example, a user operation.

With reference to the display setting information, the information processing apparatus 100 can change a method of displaying the objects involved in the predetermined event for which the metadata is set (also including non-indication that the metadata is set). In addition, in a case where the content indicated by the display setting information is changed on the basis of the user operation, a user can select a method of displaying the objects involved in the predetermined event for which the metadata is set.

Note that the images displayed on the display screen in response to the display process are not limited to the images based on the captured images obtained by imaging sports as in the example illustrated in FIGS. 9A, 9B, 9C, and 9D.

Figure 10:
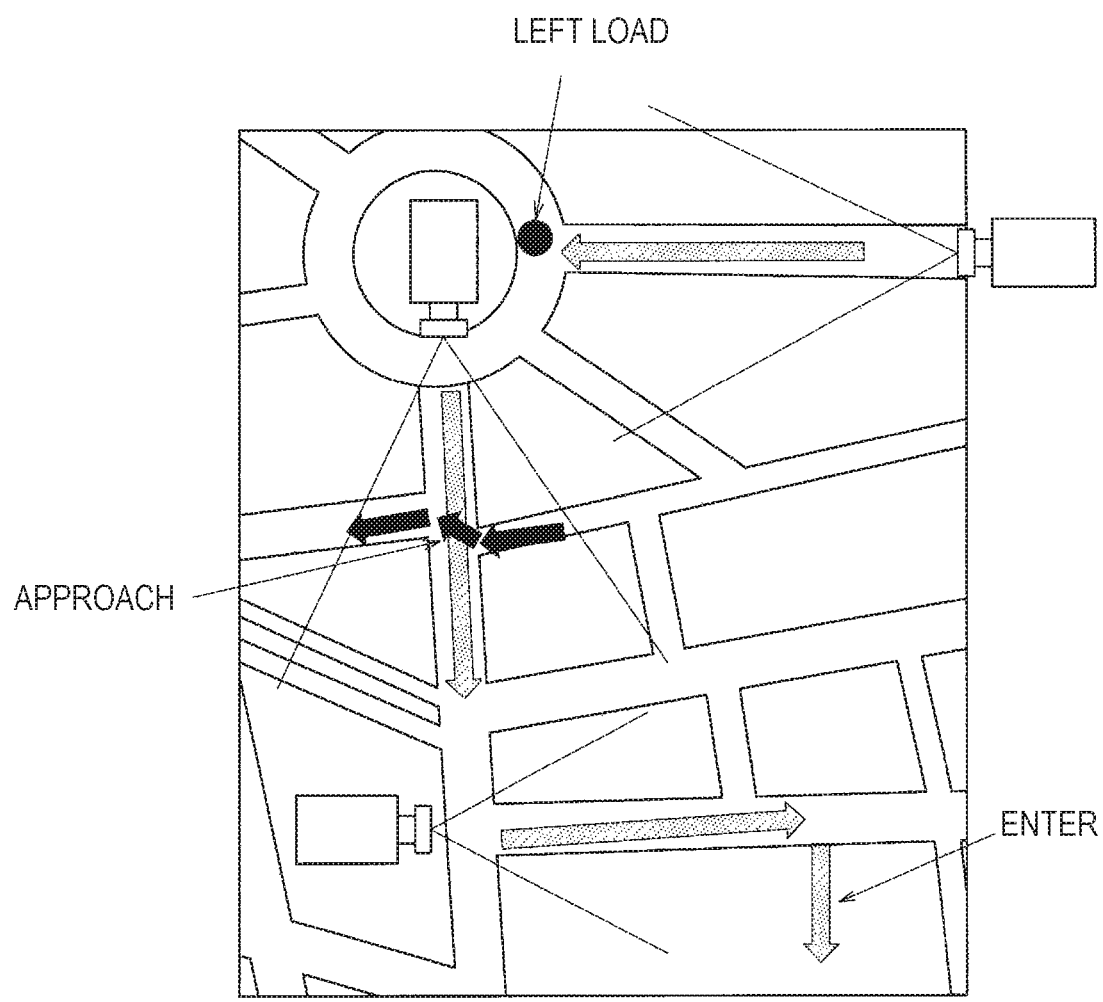
FIG. 10 is an explanatory diagram illustrating another example of the display process related to the information processing method according to the embodiment.

FIG. 10 is an explanatory diagram illustrating another example of the display process related to the information processing method according to the embodiment. FIG. 10 illustrates an example of a case where the images based on the captured images captured by the imaging device 200 functioning as a surveillance camera are displayed on the display screen in response to the display process.

In a case where the information processing system 1000 includes the imaging device 200 functioning as a surveillance camera, an intrusion of a person into a restricted area can be exemplified as an example of the predetermined event. The information processing apparatus 100 sets a time point at which a person intrudes into a restricted area as a time point at which the predetermined event is detected and sets the metadata in the objects involved in the predetermined event according to the setting process. The information processing apparatus 100 sets the metadata in the objects involved in the predetermined event according to, for example, the setting process according to the foregoing first example or the setting process according to the foregoing second example.

Examples of the setting of the metadata in the objects involved in the predetermined event are as follows:
  setting a tag in a person entering a restricted area (an example of setting of the metadata in the first object);
  setting a tag in another person approaching the person entering the restricted area (an example of setting of the metadata in the second object);
  setting a tag in a load left by the person entering the restricted area (an example of setting the metadata in the second object); and
  setting a tag in a load taken by the person entering the restricted area (an example of setting of the metadata in the second object).

In a case where the information processing system 1000 includes the plurality of imaging devices 200 functioning as surveillance cameras, the information processing apparatus 100 sets the metadata for each of the captured images captured by each of the imaging devices 200. In addition, the information processing apparatus 100 performs any object detection process on each of the captured images captured by each of the imaging devices 200. Then, the information processing apparatus 100 integrates the metadata in which the same metadata is set in the same object using the result of the object detection process.

The information processing apparatus 100 controls to display the images in which the objects in which the metadata is set are shown on the display screen using the metadata set as described above.

In a case where the predetermined event is an intrusion of a person into a restricted area, examples of the images controlled to be displayed on the display screen by the information processing apparatus 100 are as follows. Note that it goes without saying that the examples of the images displayed on the display screen in the case where the predetermined event is the intrusion of the person into the restricted area are not limited to the following examples:
  an image in which an object in which the metadata is set is displayed on a map indicating a region in which the imaging device 200 (an example of an expression capable of overlooking a whole place in which the predetermined event occurs) is disposed.
  images in which the objects in which the metadata is set are simultaneously displayed in a time series on the map;
  an image in which a travel direction of the object in which the metadata is set is displayed with an arrow or the like;
  an image in which a time until an event or a sub-event occurs is displayed; and
  a combination of two or more of the foregoing images.

[1-4-3] Example of Configuration of Information Processing Apparatus 100

An example of a configuration of the information processing apparatus 100 which can perform the above-described processing associated with the information processing method according to the present embodiment will be described next.

Figure 11:
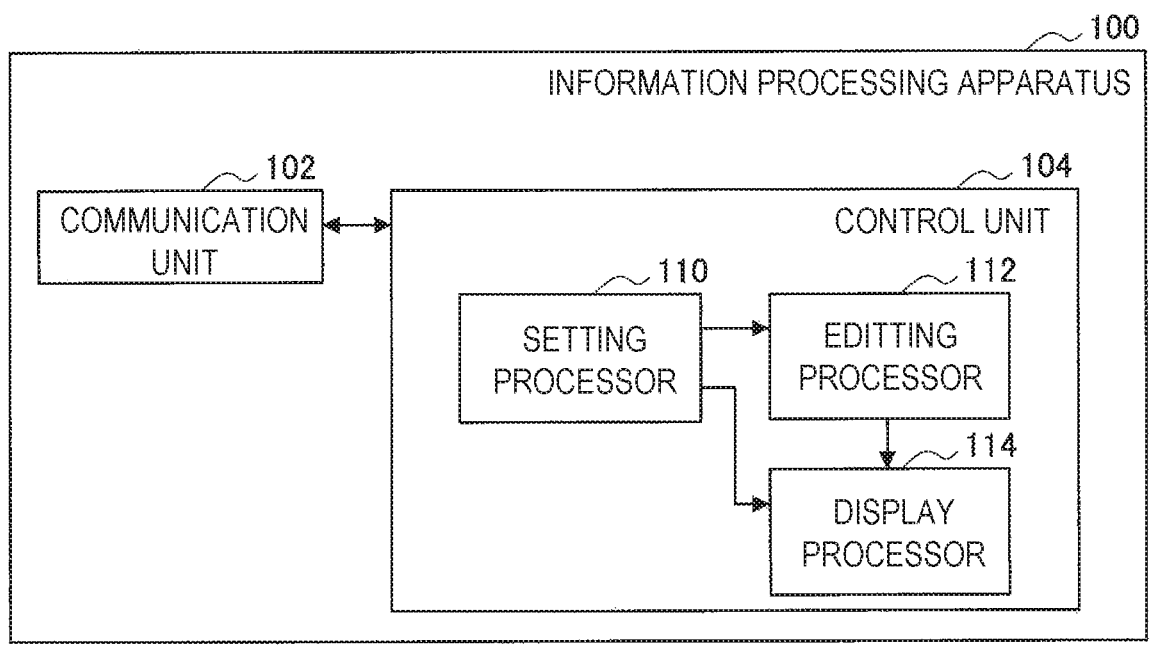
FIG. 11 is a block diagram illustrating an example of a configuration of an information processing apparatus according to the present embodiment.

FIG. 11 is a block diagram illustrating an example of the configuration of the information processing apparatus 100 according to the present embodiment. The information processing apparatus 100 includes, for example, a communication unit 102 and a control unit 104.

Further, the information processing apparatus 100 may include, for example, a read only memory (ROM, which is not illustrated), a random access memory (RAM, which is not illustrated), a storage unit (which is not illustrated), an operation unit (which is not illustrated) which can be operated by the user of the information processing apparatus 100, a display unit (which is not illustrated) which displays various screens on a display screen, or the like. The information processing apparatus 100, for example, connects the above-described respective components using a bus which is a data transmission path.

The ROM (which is not illustrated) stores control data such as a program and an operation parameter to be used by the control unit 104. The RAM (which is not illustrated) temporarily stores a program to be executed by the control unit 104 and the like.

The storage unit (which is not illustrated), which is storage means provided at the information processing apparatus 100, for example, stores various kinds of data, such as data or various kinds of application associated with the information processing method according to the present embodiment. Here, examples of the storage unit (which is not illustrated) can include, for example, a magnetic recording medium such as a hard disk, a nonvolatile memory such as a flash memory, and the like. Further, the storage unit (which is not illustrated) may be detachable from the information processing apparatus 100.

Examples of the operation unit (which is not illustrated) can include an operation input device which will be described later. Further, examples of the display unit (which is not illustrated) can include a display device which will be described later.

[Hardware Configuration Example of Information Processing Apparatus 100]

Figure 12:
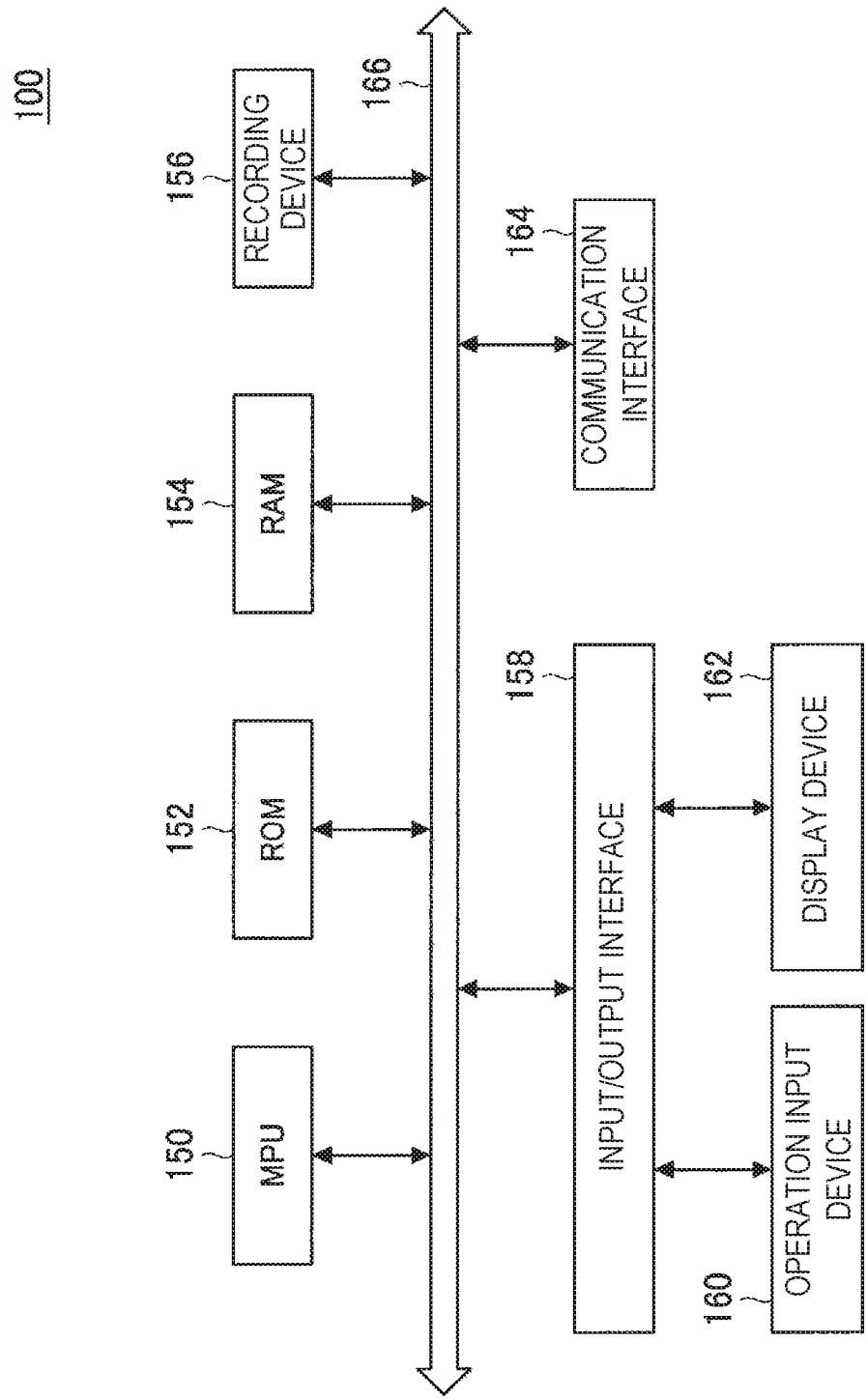
FIG. 12 is an explanatory diagram illustrating an example of a hardware configuration of the information processing apparatus according to the present embodiment.

FIG. 12 is an explanatory diagram illustrating an example of a hardware configuration of the information processing apparatus 100 according to the present embodiment. The information processing apparatus 100 includes, for example, an MPU 150, a ROM 152, a RAM 154, a recording medium 156, an input/output interface 158, an operation input device 160, a display device 162 and a communication interface 164. Further, the information processing apparatus 100 connects the respective components using a bus 166 which is a data transmission path, for example. In addition, for example, the information processing apparatus 100 is driven by power supplied from an internal power source such as a battery included in the information processing apparatus 100, power supplied from a connected external power source, or the like.

The MPU 150 includes, for example, one or two or more processors including an arithmetic circuit such as a micro processing unit (MPU), various kinds of processing circuits, or the like, and functions as a control unit 104 which controls the whole of the information processing apparatus 100. In addition, the MPU 150 has roles of a setting processor 110, an editing processor 112, and a display processor 114 to be described below, for example, in the information processing apparatus 100. Note that some or all of the setting processor 110, the editing processor 112, and the display processor 114 may be configured by dedicated (or general purpose) circuits (for example, processors separate from the MPU 150 or the like).

The ROM 152 stores control data such as a program and an operation parameter, or the like, to be used by the MPU 150. The RAM 154 temporarily stores a program, or the like, to be executed by the MPU 150, for example.

The recording medium 156 functions as a storage unit (which is not illustrated) and, for example, stores various kinds of data such as data or various kinds of application associated with the information processing method according to the present embodiment. Here, examples of the recording medium 156 can include, for example, a magnetic recording medium such as a hard disk, and a nonvolatile memory such as a flash memory. Further, the recording medium 156 may be detachable from the information processing apparatus 100.

The input/output interface 158, for example, connects the operation input device 160 and the display device 162. The operation input device 160 functions as an operation unit (which is not illustrated), and the display device 162 functions as a display unit (which is not illustrated). Here, examples of the input/output interface 158 can include, for example, a universal serial bus (USB) terminal, a digital visual interface (DVI) terminal, a high-definition multimedia interface (HDMI) (registered trademark) terminal, various kinds of processing circuits, and the like.

Further, the operation input device 160, for example, is provided on the information processing apparatus 100, and is connected to the input/output interface 158 inside the information processing apparatus 100. Examples of the operation input device 160 can include, for example, a button, a direction key, a rotary selector such as a jog dial, combination thereof, or the like.

In addition, for example, the display device 162 is provided on the information processing apparatus 100 and is connected to the input/output interface 158 inside the information processing apparatus 100. Examples of the display device 162 can include, for example, a liquid crystal display and an organic EL display.

Note that it goes without saying that the input/output interface 158 can be connected to an external device such as an external operation input device (such as, for example, a keyboard and a mouse) and an external display device of the information processing apparatus 100. Further, the display device 162 may be a device which can perform display and allow user operation, such as, for example, a touch panel.

The communication interface 164 is communication means provided in the information processing apparatus 100 and functions as the communication unit 102 that communicates with an external apparatus such as the imaging device 200, the display device 300, the storage device 400, a server (not illustrated), or the like in a wireless or wired manner via the network 500 (or directly). Here, examples of the communication interface 164 include a communication antenna and a radio frequency (RF) circuit (for wireless communication), an IEEE 802.15.1 port and a transmission/reception circuit (for wireless communication), an IEEE 802.11 port and a transmission/reception circuit (for wireless communication), a LAN terminal and transmission/reception circuit (for wired communication), and the like. In addition, the communication interface 164 may have an arbitrary configuration corresponding to the network 500.

The information processing apparatus 100 performs the processing associated with the information processing method according to the present embodiment according to the configuration illustrated in, for example FIG. 12. Note that the hardware configuration of the information processing apparatus 100 according to the present embodiment is not limited to the configuration illustrated in FIG. 12.

For example, in the case where the information processing apparatus 100 performs communication with an external apparatus, or the like, via a connected external communication device, the information processing apparatus 100 does not have to include the communication interface 164. Further, the communication interface 164 may have a configuration so as to be able to perform communication with one or two or more external apparatuses, or the like, using a plurality of communication schemes.

In addition, the information processing apparatus 100 may further includes, for example, an imaging device functioning as the imaging device 200 in the information processing system 1000. In a case where the information processing apparatus 100 includes an imaging device, the imaging device functions as an imaging unit (not illustrated) that generates a captured image (a moving image or a still image) by imaging.

In addition, the information processing apparatus 100 can employ, for example, a configurations in which some or all of the recording medium 156, the operation input device 160, and the display device 162 are not included.

In addition, the information processing apparatus 100 can employ, for example, a configuration in accordance with an application example of the information processing apparatus 100 to be described below.

In addition, for example, a part or the entirety of the configuration illustrated in FIG. 12 (or a configuration according to a modification example) may be realized by one integrated circuit (IC) or two or more ICs.

Referring to FIG. 11 again, an example of the configuration of the information processing apparatus 100 will be described. The communication unit 102, which is communication means provided at the information processing apparatus 100, performs communication via a network 500 (or directly) in a wireless or wired manner with external apparatuses such as the imaging device 200, the display device 300, or the storage device 400. Further, communication of the communication unit 102 is controlled by, for example, the control unit 104.

Here, while examples of the communication unit 102 can include, for example, a communication antenna and an RF circuit, a LAN terminal and a transmission/reception circuit, and the like, the configuration of the communication unit 102 is not limited to the above-described examples. For example, the communication unit 102 can employ a configuration supporting an arbitrary standard which enables communication, such as a USB terminal and a transmission/reception circuit, and an arbitrary configuration which enables communication with external apparatuses via a network 500. Further, the communication unit 102 may have a configuration so as to be able to perform communication with one or two or more external apparatuses or the like using a plurality of communication schemes.

The control unit 104 includes, for example, an MPU or the like and has a role in controlling the entire information processing apparatus 100. In addition, the control unit 104 includes, for example, the setting processor 110, the editing processor 112, and the display processor 114 and has a leading role in performing the process related to the information processing method according to the embodiment.

The setting processor 110 has a leading role in performing the foregoing setting process and sets the metadata in the objects included in the captured images on the basis of the captured images captured by the imaging device 200. The setting processor 110 sets the metadata by performing any one of, for example, the setting process according to the first example described in [1-4-2-1] above, the setting process according to the second example described in [1-4-2-2] above, the setting process according to the third example described in [1-4-2-3] above, and the setting process according to the fourth example described in [1-4-2-4] above.

Figure 13:
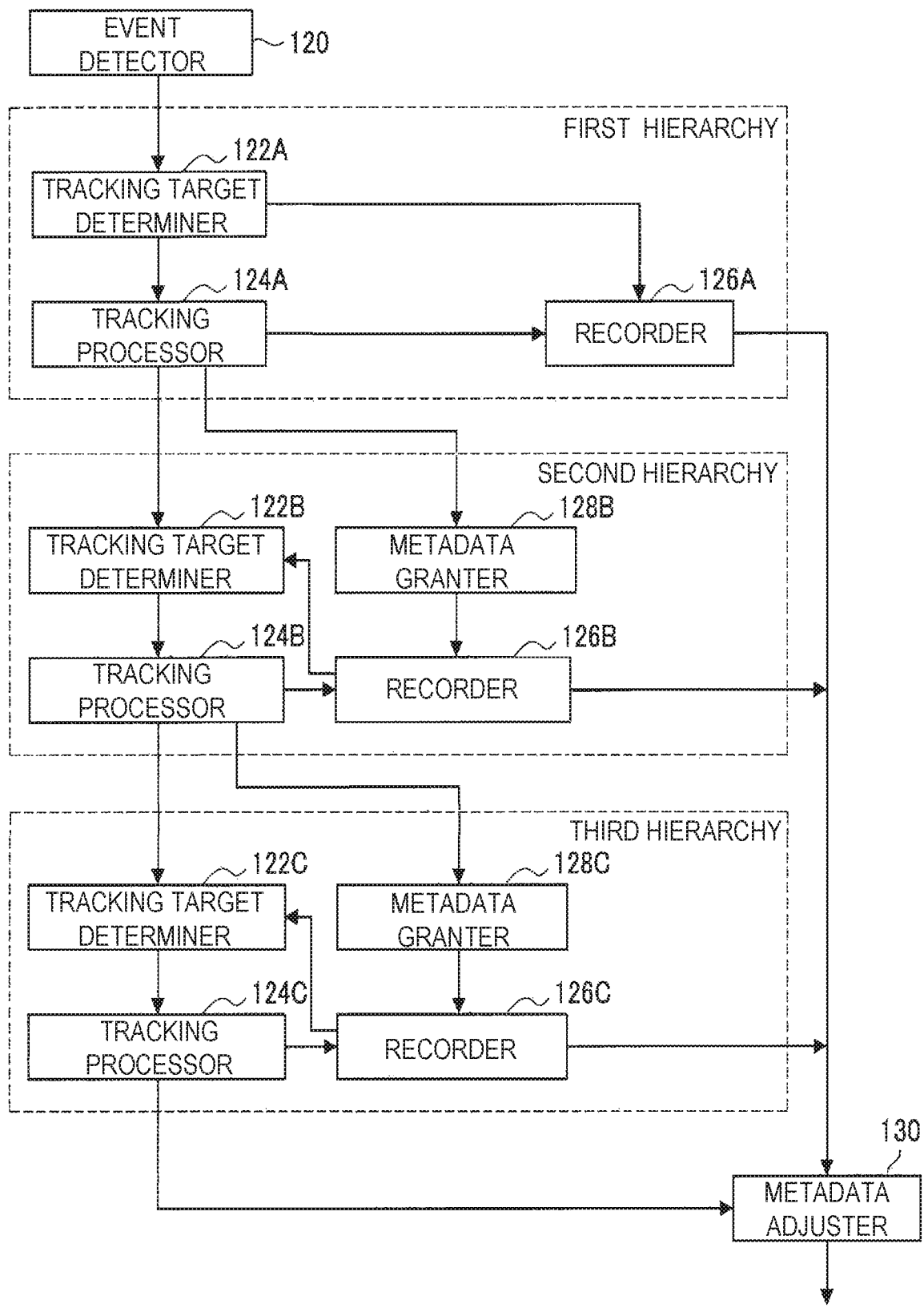
FIG. 13 is a block diagram illustrating an example of a configuration of a setting processor illustrated in FIG. 11.

FIG. 13 is a block diagram illustrating an example of a configuration of the setting processor 110 illustrated in FIG. 11. FIG. 13 illustrates an example of a configuration of the setting processor 110 in a case where metadata with hierarchies is set. FIG. 13 illustrates an example in which metadata with three hierarchies called metadata of first hierarchy to metadata of third hierarchy is set, but the number of hierarchies in a case where the metadata with hierarchies is set is not limited to three.

The setting processor 110 includes, for example, an event detector 120, tracking target determiners 122A, 122B, and 122C, tracking processors 124A, 124B, and 124C, recorders 126A, 126B, and 126C, metadata granters 128B and 128C, and a metadata adjuster 130. The tracking target determiner 122A, the tracking processor 124A, and the recorder 126A perform, for example, the process illustrated in FIG. 2 to set the metadata of the first hierarchy. In addition, the tracking target determiner 122B, the tracking processor 124B, the recorder 126B, and the metadata granter 128B perform, for example, the process illustrated in FIG. 3 to set the metadata of the second hierarchy. In addition, the tracking target determiner 122C, the tracking processor 124C, the recorder 126C, and the metadata granter 128C perform, for example, the process illustrated in FIG. 3 to set the metadata of the third hierarchy.

The event detector 120 detects the predetermined event.

If the event detector 120 detects the predetermined event, the tracking target determiner 122A determines a tracking target object. The tracking target determined by the tracking target determiner 122A is a first object (the object directly involved in the predetermined event).

If the tracking target determiner 122A determines the tracking target object, the recorder 126A records the set metadata and the position of the object in a recording medium such as a storage unit (not illustrated) or the like.

The tracking processor 124A tracks the tracking target object determined by the tracking target determiner 122A and the recorder 126A records a tracking result in the tracking processor 124A in a recording medium.

In addition, the tracking processor 124A determines whether or not there are other objects near the tracking target object. In a case where it is determined that there are the other objects, the tracking processor 124A delivers a determination result to the metadata granter 128B.

The metadata granter 128B sets the metadata of the second hierarchy on the basis of a determination result delivered from the tracking processor 124A. If the metadata of the second hierarchy is set, the recorder 126B records the set metadata and the positions of the objects in the recording medium.

In a case where it is determined that the tracking of the tracking target object determined by the tracking target determiner 122A ends, the tracking processor 124A delivers the end of the tracking to the tracking processor 124B.

The tracking processor 124B to which the end of the tracking is delivered determines a tracking target using a recorded result of the recorder 126B. The tracking target determined by the tracking target determiner 122B is the third object (the object directly involved with the first object).

The tracking processor 124B tracks the tracking target object determined by the tracking target determiner 122B and the recorder 126B records a tracking result in the tracking processor 124B in a recording medium.

In addition, the tracking processor 124B determines whether or not there are other objects near the tracking target object. In a case where it is determined that there are the other objects, the tracking processor 124B delivers a determination result to the metadata granter 128C.

The metadata granter 128C sets the metadata of the third hierarchy on the basis of a determination result delivered from the tracking processor 124B. If the metadata of the third hierarchy is set, the recorder 126C records the set metadata and the positions of the objects in the recording medium.

In a case where it is determined that the tracking of the tracking target object determined by the tracking target determiner 122B ends, the tracking processor 124B delivers the end of the tracking to the tracking processor 124C.

The tracking processor 124C to which the end of the tracking is delivered determines a tracking target using a recorded result of the recorder 126C. The tracking target determined by the tracking target determiner 122C is the fourth object (the object directly involved with the third object).

The tracking processor 124C tracks the tracking target object determined by the tracking target determiner 122C and the recorder 126C records a tracking result in the tracking processor 124C in a recording medium.

In a case where it is determined that the tracking of the tracking target object determined by the tracking target determiner 122C ends, the tracking processor 124C delivers the end of the tracking to the metadata adjuster 130.

The metadata adjuster 130 integrates the different pieces of metadata set in the same object, for example, by performing the process described in (C) above.

The setting processor 110 sets the metadata with the hierarchies, for example, by performing the process illustrated in FIG. 2 or 3 according to the configuration illustrated in FIG. 13.

Note that the configuration of the setting processor 110 is not limited to the example illustrated in FIG. 13.

For example, FIG. 13 illustrates the example in which the metadata is set until the metadata is set up to the preset hierarchy. However, the setting processor 110 may set the metadata up to hierarchy in which metadata may not be newly set. That is, the setting processor 110 can dynamically change the number of hierarchies.

In addition, as described above, the setting processor 110 can also set the metadata with no hierarchy.

An example of the configuration of the information processing apparatus 100 will be described with reference to FIG. 11 again. The editing processor 112 has a leading role in performing the editing process and edits the captured images on the basis of a set result of the metadata in the setting processor 110. The editing processor 112 edits the captured images, for example, by performing the editing process described in [1-4-2-5] above.

The display processor 114 has a leading role in performing the display process and controls to display the images in which the objects involved in the predetermined event for which the metadata is set are shown on the display screen on the basis of the set result of the metadata in the setting processor 110. The display processor 114 controls to display the images in which the objects involved in the predetermined event for which the metadata is set are shown on the display screen, for example, by performing the display process described in [1-4-2-6] above.

The control unit 104 includes, for example, the setting processor 110, the editing processor 112, and the display processor 114 and has a leading role in performing the process related to the information processing method according to the embodiment.

Note that the configuration of the control unit 104 is not limited to the example illustrated in FIG. 11.

For example, the control unit 104 may not include one or both of the editing processor 112 and the display processor 114. Even in a case where the control unit 104 does not include one or both of the editing processor 112 and the display processor 114, the control unit 104 can set the metadata in response to the setting process. Accordingly, even in the configuration in which the control unit 104 does not include one or both of the editing processor 112 and the display processor 114, the information processing apparatus 100 can assist with ascertainment of the predetermined event detected on the basis of the captured images.

In addition, for example, the control unit 104 can have a configuration in accordance with a method of separating the process related to the information processing method according to the embodiment.

The information processing apparatus 100 performs the processes (for example, the setting process, the editing process, and the display process) according to the information processing method of the embodiment according to, for example, the configuration illustrated in FIG. 11. Accordingly, for example, the information processing apparatus 100 can assist with ascertainment of the predetermined event detected on the basis of the captured images according to the configuration illustrated in FIG. 11.

Further, the information processing apparatus 100 can provide an effect provided by the processing associated with the information processing method according to the present embodiment as described above being performed according to the configuration illustrated in, for example, FIG. 11.

Note that the configuration of the information processing apparatus according to the present embodiment is not limited to the configuration illustrated in FIG. 11.

For example, the information processing apparatus according to the embodiment can include some or all of the setting processor 110, the editing processor 112, and the display processor 114 illustrated in FIG. 11 individually from the control unit 104 (for example, some or all of the editing processor 112 and the display processor 114 are realized by different processing circuits).

In addition, as described above, the information processing apparatus according to the embodiment may not include one or both of the editing processor 112 and the display processor 114.

In addition, as described above, the configuration for realizing the processes related to the information processing method according to the embodiment is not limited to the configuration illustrated in FIG. 11 and a configuration in accordance with a method of separating the processes related to the information processing method according to the embodiment can be employed.

Further, for example, in the case where communication is performed with an external apparatus via an external communication device having functions and a configuration similar to those of the communication unit 102, the information processing apparatus according to the present embodiment does not have to include the communication unit 102.

[2] Application Example of Each Apparatus Included in Information Processing System According to Embodiment The information processing apparatus has been described above as a component of the information processing system according to the embodiment, but the embodiment is not limited thereto. For example, the embodiment can be applied to various apparatuses capable of performing the process related to the information processing method according to the embodiment, such as "a computer such as a personal computer (PC), a server, or the like" "a tablet apparatus," "a game apparatus," and "a camera such as a digital still camera, a digital video camera, or the like". In addition, the embodiment can also be applied to, for example, a processing IC which can be embedded in the foregoing apparatus.

In addition, the information processing apparatus according to the embodiment may be applied to a processing system on the assumption of connection to, for example, a network (or communication between apparatuses) such as cloud computing or the like. Examples of the processing system that performs the process related to the information processing method according to the embodiment include "a system in which one apparatus included in the processing system performs some of the processes related to the information processing method according to the embodiment and another apparatus included in the processing system performs a process other than some of the processes related to the information processing method according to the embodiment" and the like.

In addition, the imaging device has been described as a component of the information processing system according to the embodiment, but the embodiment is not limited thereto. In the embodiment, for example, any apparatus that has an imaging function, such as "a camera such as a digital still camera, a digital video camera, or the like," "a communication apparatus such as a smartphone, a cellular phone, or the like capable of performing imaging," "a tablet apparatus capable of performing imaging," or "a game apparatus capable of performing imaging," can be exemplified. In addition, as described above, in the information processing system according to the embodiment, the information processing apparatus according to the embodiment may have the role of the imaging device.

In addition, the display device has been described as a component of the information processing system according to the embodiment, but the embodiment is not limited thereto. In the embodiment, for example, any apparatus that has a function of displaying an image, such as "a television receiver or the like," "a wearable apparatus such as a head-mounted display, a glasses type apparatus, or the like," "a computer such as a PC capable or the like of performing display," "a tablet apparatus capable of performing display," "a camera such as a digital still camera, a digital video camera, or the like capable of performing display," "a communication apparatus such as a smartphone, a cellular phone, or the like capable of performing display," or "a game apparatus capable of performing display," can be exemplified.

In addition, the storage device has been described as a component of the information processing system according to the embodiment, but the embodiment is not limited thereto. In the embodiment, for example, any apparatus that has a function of storing data in a recording medium, such as "a computer such as a PC or the like capable of storing data," "a tablet apparatus capable of storing data," "a camera such as a digital still camera, a digital video camera, or the like capable of storing data," "a communication apparatus such as a smartphone, a cellular phone, or the like capable of storing data," or "a game apparatus capable of storing data" can be exemplified.

(Program According to Embodiment)

A program causing a computer system to control to function as the information processing apparatus according to the embodiment (for example, a program capable of performing the process related to the information processing method according to the embodiment, such as "the setting process," "a process of combining the setting process and one or both of the editing process and the display process," or the like) is executed by a processor or the like in the computer system, and thus can assist with the ascertainment of the predetermined event detected on the basis of the captured images. Here, a single computer or a plurality of computers can be exemplified as the computer system according to the embodiment. The computer system according to the embodiment performs a series of processes related to the information processing method according to the embodiment.

Moreover, when a program that causes a computer system to function as the information processing apparatus according to the present embodiment is executed by a processor or the like in the computer system, it is possible to provide an effect provided by the processing related to the information processing method according to the present embodiment described above.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it has been illustrated above that a program (computer program) that causes a computer system to function as the information processing apparatus according to the present embodiment is provided, but the present embodiment can further provide a recording medium in which the above-described program is stored together.

The above-described configurations express examples of the present embodiment and, of course, pertain to the technical scope of the present disclosure.

Note that the effects described above are not necessarily limitative. That is, with or in the place of the above effects, there may be achieved any one of the effects described in this specification or other effects that may be grasped from this specification.

Additionally, the technical scope of the present disclosure may also be configured as below.

(1)

An information processing apparatus including: a setting processor configured to set metadata for objects included in captured images captured in a time series by an imaging device on the basis of the captured image, in which the setting processor processes the captured images in a reverse time series reverse to the time series from a predetermined event detected from the captured images and sets the metadata for objects involved in the predetermined event among the objects included in the captured images.

(2)

The information processing apparatus according to (1), in which the setting processor sets the metadata for each of a first object directly involved in the predetermined event and a second object indirectly involved in the predetermined event.

(3)

The information processing apparatus according to (2), in which the setting processor identifies the first object from the captured images in which the predetermined event is detected, determines an object involved with the identified first object by processing the captured images in the reverse time series, and sets the determined object involved with the first object as the second object.

(4)

The information processing apparatus according to (3), in which the setting processor detects the first object for each of the captured images corresponding to each time point of the reverse time series, determines a third object directly involved with the first object from the captured images in which the first object is detected, and sets the determined third object as the second object.

(5)

The information processing apparatus according to (4), in which the setting processor determines an object of which a distance from the first object is equal to or less than a predetermined threshold or an object of which a distance from the first object is less than the predetermined threshold as the third object.

(6)

The information processing apparatus according to (4) or (5), in which the setting processor further determines a fourth object directly involved with the third object from the captured image including the determined third object and sets the determined fourth object as the second object.

(7)

The information processing apparatus according to any one of (1) to (6), in which the setting processor processes the captured image corresponding to each time point of the reverse time series during a period from a time point at which the predetermined event is detected until a time point at which a predetermined condition in the reverse time series is satisfied.

(8)

The information processing apparatus according to (7), in which the predetermined condition includes one or both of a temporal condition and a condition related to an object detected from the captured image.

(9)

The information processing apparatus according to any one of (1) to (8), in which the setting processor further processes the captured images in the time series from the predetermined event and sets the metadata in the objects involved in the predetermined event.

(10)

The information processing apparatus according to any one of (1) to (9), in which the setting processor determines the same object in which different pieces of metadata are set among the objects involved in the predetermined event for which the metadata is set and integrates the different pieces of metadata set for the same object.

(11)

The information processing apparatus according to any one of (1) to (10), in which the setting processor sets the metadata for the objects involved in the predetermined event on the basis of the captured images captured by a plurality of the imaging devices.

(12)

The information processing apparatus according to (11), in which the setting processor processes the captured images for each of the imaging devices and sets the metadata for the objects involved in the predetermined event for each of the imaging devices.

(13)

The information processing apparatus according to (12), in which the setting processor associates the objects involved in the predetermined event for which the metadata is set for each of the imaging devices.

(14)

The information processing apparatus according to (13), in which the setting processor records relevance of the metadata set for the different associated objects for each set piece of metadata.

(15)

The information processing apparatus according to (11), in which the setting processor sets the metadata for the objects involved in the predetermined event among the objects included in the captured images captured by some imaging devices of the plurality of imaging devices on the basis of the captured images captured by the some imaging devices and sets the metadata for the objects involved in the predetermined event among the objects included in the captured images captured by remaining imaging devices of the plurality of imaging device on the basis of a set result of the metadata based on the captured images captured by the some imaging devices and the captured images captured by the remaining imaging device.

(16)

The information processing apparatus according to any one of (1) to (15), further including: an editing processor configured to edit the captured images on the basis of a set result of the metadata for the objects involved in the predetermined event.

(17)

The information processing apparatus according to (16), in which the editing processor edits the captured images in response to image processing including one or both of electronic zoom on the captured images and a combination of a plurality of images based on the captured images.

(18)

The information processing apparatus according to any one of (1) to (17), further including: a display processor configured to display an image in which the objects involved in the predetermined event for which the metadata is set are shown on a display screen on the basis of a set result of the metadata for the objects involved in the predetermined event.

(19)

The information processing apparatus according to (18), in which the display processor changes a way of displaying the objects involved in the predetermined event for which the metadata is set on the basis of display setting information.

(20)

An information processing method executed by an information processing apparatus, the method including:

setting metadata for objects included in captured images captured in a time series by an imaging device on the basis of the captured image, in which, in the setting, the captured images are processed in a reverse time series reverse to the time series from a predetermined event detected from the captured images and the metadata is set for objects involved in the predetermined event among the objects included in the captured images.

REFERENCE SIGNS LIST

100 Information processing apparatus
102 Communication unit
104 Control unit
110 Setting processor
112 Editing processor
114 Display processor
120 Event detector
122A, 122B, 122C Tracking target determiner
124A, 124B, 124C Tracking processor
126A, 126B, 126C Recorder
128B, 128C Metadata granter
130 Metadata adjuster
162, 300 Display device
200, 200A, 200B Imaging device
500 Network
1000 Information processing system

The invention claimed is:

1. An information processing apparatus, comprising:
a setting processor configured to:
detect an event from a plurality of captured images, wherein the plurality of captured images is captured in a time series by an imaging device of a plurality of imaging devices;
determine two objects from a plurality of objects as same objects, wherein
the plurality of objects is included in the plurality of captured images,
the determination of the same objects is based on a position of each object of the two objects and a set of images of the plurality of captured images, and
the determined two objects are present in the set of images;
set a plurality of pieces of metadata for the plurality of objects, wherein
two pieces of metadata of the plurality of pieces of metadata associated with the determined two objects are different,
the plurality of pieces of metadata is set based on the plurality of captured images;

process the plurality of captured images in a reverse time series that is reverse to the time series from the detected event; and integrate the two different pieces of metadata for the same objects.

2. The information processing apparatus according to claim 1, wherein the setting processor is further configured to:

set a first piece of metadata of the plurality of pieces of metadata for a first object of the plurality of objects directly involved in the detected event, and set a second piece of metadata of the plurality of pieces of metadata for a second object of the plurality of objects indirectly involved in the detected event.

3. The information processing apparatus according to claim 2, wherein the setting processor is further configured to:

identify the first object from the plurality of captured images, determine a third object of the plurality of objects involved with the identified first object based on a processing operation on the plurality of captured images in the reverse time series, and set the determined third object involved with the first object as the second object.

4. The information processing apparatus according to claim 3, wherein the setting processor is further configured to:

detect the first object for each captured image of the plurality of captured images, wherein each captured image corresponds to a respective time point of the reverse time series, determine a fourth object of the plurality of objects directly involved with the first object, wherein the fourth object is determined from the plurality of captured images in which the first object is detected, and set the determined fourth object as the second object.

5. The information processing apparatus according to claim 4, wherein the setting processor is further configured to determine a fifth object of the plurality of objects, and a distance of the determined fifth object from the first object is equal to or less than a threshold.

6. The information processing apparatus according to claim 4, wherein the setting processor is further configured to:

determine a fifth object of the plurality of objects directly involved with the fourth object, wherein the fifth object is determined from the plurality of captured images that includes the determined fourth object and set the determined fifth object as the second object.

7. The information processing apparatus according to claim 1, wherein the setting processor is further configured to process each captured image of the plurality of captured images, each captured image of the plurality of captured images corresponds to a respective time point of the reverse time series, and the plurality of captured images are processed from a first time point at which the event is detected to a second time point at which a condition in the reverse time series is satisfied.

8. The information processing apparatus according to claim 7, wherein the condition includes at least one of a temporal condition or a condition related to an object of the plurality of objects.

9. The information processing apparatus according to claim 1, wherein the setting processor is further configured to:

process the plurality of captured images in the time series from detected event; and set the plurality of pieces of metadata in the plurality of objects.

10. The information processing apparatus according to claim 1, wherein the setting processor is further configured to set the plurality of pieces of metadata for the plurality of objects based on the plurality of captured images, and the plurality of images is captured by the plurality of imaging devices.

11. The information processing apparatus according to claim 10, wherein the setting processor is further configured to:

process the plurality of captured images for each of the plurality of imaging devices, and set the plurality of pieces of metadata for the plurality of objects for each of the plurality of imaging devices.

12. The information processing apparatus according to claim 11, wherein the setting processor is further configured to associate the plurality of objects with the set plurality of pieces of metadata for each of the plurality of imaging devices.

13. The information processing apparatus according to claim 12, wherein the setting processor is further configured to record relevance of the set plurality of pieces of metadata for the associated plurality of objects for each set piece of metadata of the set plurality of pieces of metadata.

14. The information processing apparatus according to claim 10, wherein the setting processor is further configured to:

set the plurality of pieces of metadata for a set of objects of the plurality of objects, wherein the set of objects is involved in the detected event, wherein the plurality of images is captured by a first set of imaging devices of the plurality of imaging devices, and the plurality of pieces of metadata is set based on the plurality of captured images captured by the first set of the imaging devices, and set the plurality of pieces of metadata for the set of objects of the plurality of objects, wherein the set of objects is involved in the detected event, wherein the plurality of images is captured by a second set of imaging devices other than the first set of the imaging devices, the plurality of imaging devices includes the second set of imaging devices, the second plurality of pieces of metadata is set based on a set result of the plurality of pieces of metadata, and the plurality of pieces of metadata is set based on each of the plurality of captured images captured by the first set of the imaging devices and the plurality of captured images captured by the second set of imaging devices.

15. The information processing apparatus according to claim 1, further comprising an editing processor configured to edit the plurality of captured images based on a set result of the plurality of pieces of metadata for the plurality of objects.

16. The information processing apparatus according to claim 15, wherein the editing processor edits the plurality of captured images based on an image processing operation, and the image processing operation includes at least one of an electronic zoom operation on the plurality of captured images, or a combination of a plurality of images based on the plurality of captured images.

17. The information processing apparatus according to claim 1, further comprising a display processor configured to display an image of the plurality of captured images on a display screen based on a set result of the plurality of pieces of metadata, wherein the displayed image displays the plurality of objects involved in the detected event for which the plurality of pieces of metadata is set.

18. The information processing apparatus according to claim 17, wherein the display processor is further configured to change the display of the plurality of objects based on display setting information.

19. An information processing method, comprising:

detecting an event from a plurality of captured images, wherein the plurality of captured images is captured in a time series by an imaging device of a plurality of imaging devices;

determining two objects from a plurality of objects as same objects, wherein the plurality of objects is included in the plurality of captured images, the determination of the same objects is based on a position of each object of the two objects and a set of images of the plurality of captured images, and the determined two objects are present in the set of images;

setting a plurality of pieces of metadata for the plurality of objects, wherein two pieces of metadata of the plurality of pieces of metadata associated with the determined two objects are different, the plurality of pieces of metadata is set based on the plurality of captured images;

processing, in the setting, the plurality of captured images in a reverse time series that is reverse to the time series from the detected event; and integrating the two different pieces of metadata for the same objects.

* * * * *